US 11,051,284 B2

(12) United States Patent
Ghosh et al.

(10) Patent No.: US 11,051,284 B2
(45) Date of Patent: Jun. 29, 2021

(54) TRIGGER FRAMES FOR RANGE ESTIMATION IN WIRELESS LOCAL AREA NETWORK (WLAN)

(71) Applicant: Intel IP Corporation, Santa Clara, CA (US)

(72) Inventors: Chittabrata Ghosh, Fremont, CA (US); Feng Jiang, Santa Clara, CA (US); Qinghua Li, San Ramon, CA (US); Yuval Amizur, Kfar-Saba (IL); Jonathan Segev, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 138 days.

(21) Appl. No.: 16/467,674

(22) PCT Filed: Mar. 31, 2017

(86) PCT No.: PCT/US2017/025282
§ 371 (c)(1),
(2) Date: Jun. 7, 2019

(87) PCT Pub. No.: WO2018/106274
PCT Pub. Date: Jun. 14, 2018

(65) Prior Publication Data
US 2019/0373599 A1 Dec. 5, 2019

Related U.S. Application Data

(60) Provisional application No. 62/430,986, filed on Dec. 7, 2016.

(51) Int. Cl.
H04W 72/04 (2009.01)
H04W 76/11 (2018.01)
(Continued)

(52) U.S. Cl.
CPC ....... *H04W 72/0413* (2013.01); *H04W 24/10* (2013.01); *H04W 72/0446* (2013.01); *H04W 76/11* (2018.02); *H04W 84/12* (2013.01)

(58) Field of Classification Search
None
See application file for complete search history.

(56) References Cited

U.S. PATENT DOCUMENTS

2007/0218926 A1* 9/2007 Zhuang ................. H04W 60/04
455/466
2015/0244448 A1 8/2015 Seok
(Continued)

FOREIGN PATENT DOCUMENTS

WO WO-2016167438 A1 10/2016
WO WO-2018106274 A1 6/2018

OTHER PUBLICATIONS

"International Application Serial No. PCT/US2017/025282, International Search Report dated Aug. 28, 2017", 4 pgs.
(Continued)

Primary Examiner — Alex Skripnikov
Assistant Examiner — Richard Schnell
(74) Attorney, Agent, or Firm — Schwegman Lundberg & Woessner, P.A.

(57) ABSTRACT

Embodiments of an access point (AP), a user station (STA), and a method for range estimation in a wireless network are generally described herein. For example, the AP may encode a common information field of a first trigger frame to include a trigger frame type configured to check the readiness of associated and unassociated STAs. The AP may transmit the first trigger frame to STAs and receive feedback from the STAs. The AP may further encode, based on the feedback, a common information field of a second trigger frame to include one of: a trigger frame type that solicits negotiation packets from associated and unassociated STAs using an
(Continued)

association identifier (AID) and a pre-AID; or a trigger frame type that solicits channel sounding packets from associated and unassociated STAs using an AID and a pre-AID. The AP may further transmit the second trigger frame to the STAs.

20 Claims, 13 Drawing Sheets

(51) Int. Cl.
*H04W 24/10* (2009.01)
*H04W 84/12* (2009.01)

(56) References Cited

U.S. PATENT DOCUMENTS

2016/0081054 A1* 3/2016 Zhang .................. G01S 1/00 370/252
2017/0373398 A1* 12/2017 Komulainen ..... H04W 72/0413
2018/0070330 A1* 3/2018 Chu .................... H04B 7/0452

OTHER PUBLICATIONS

"International Application Serial No. PCT/US2017/025282, Written Opinion dated Aug. 28, 2017", 6 pgs.

Chittabrata, Ghosh, et al., "Location Measurement Protocol for 11ax", in: mentor.ieee.org, document No. IEEE 802.11-16/1015r0, (Jul. 26, 2016), 4, 9-10.

Robert, Stacey, et al., "Proposed TGax draft specification", in: mentor.ieee.org, IEEE P802.11 Wireless LANs, document No. IEEE 802.ll-16/0024r1, (Mar. 2, 2016).

Simone, Merlin, et al., "Comment Resolutions on UL MU Operation", in: mentor.ieee.org, IEEE P802.11 Wireless LANs, document No. IEEE 802.11-16/0929r0, (Jul. 25, 2016).

* cited by examiner

| B0 B3 | B4 B15 | B16 | B17 | B18 B19 | B20 B21 | B22 | B23 B25 | B26 |
|---|---|---|---|---|---|---|---|---|
| TRIGGER TYPE | LENGTH | CASCADE INDICATION | CS REQUIRED | BW | GI AND LTF TYPE (#1420) (#1300) | MU-MIMO LTF MODE | NUMBER OF HE-LTF SYMBOLS | STBC |
| BITS 4 | 12 | 1 | 1 | 2 | 2 | 1 | 3 | 1 |

| TRIGGER TYPE FIELD VALUE | DESCRIPTION |
| --- | --- |
| 0 | BASIC TRIGGER |
| 1 | BEAMFORMING REPORT POLL (#ED) |
| 2 | MU-BAR |
| 3 | MU-RTS |
| 4 | BUFFER STATUS REPORT POLL (BSRP) (#824) |
| 5 | GCR MU-BAR (#6) |
| 6 | BANDWIDTH QUERY REPORT POLL (BQRP)(MU MOTION #61) |
| 7 | RESERVED (ALLOCATABLE FOR TRIGGER FRAME TO CHECK READINESS OF STAS, e.g., CASE 1) |
| 8 | RESERVED (ALLOCATABLE FOR TRIGGER FRAME FOR NEGOTIATION PHASE, e.g., CASE 2) |
| 9 | RESERVED (ALLOCATABLE FOR TRIGGER FRAME FOR MEASUREMENT PHASE, e.g., CASE 3) |
| 10-15(#262) | RESERVED |

FIG. 7

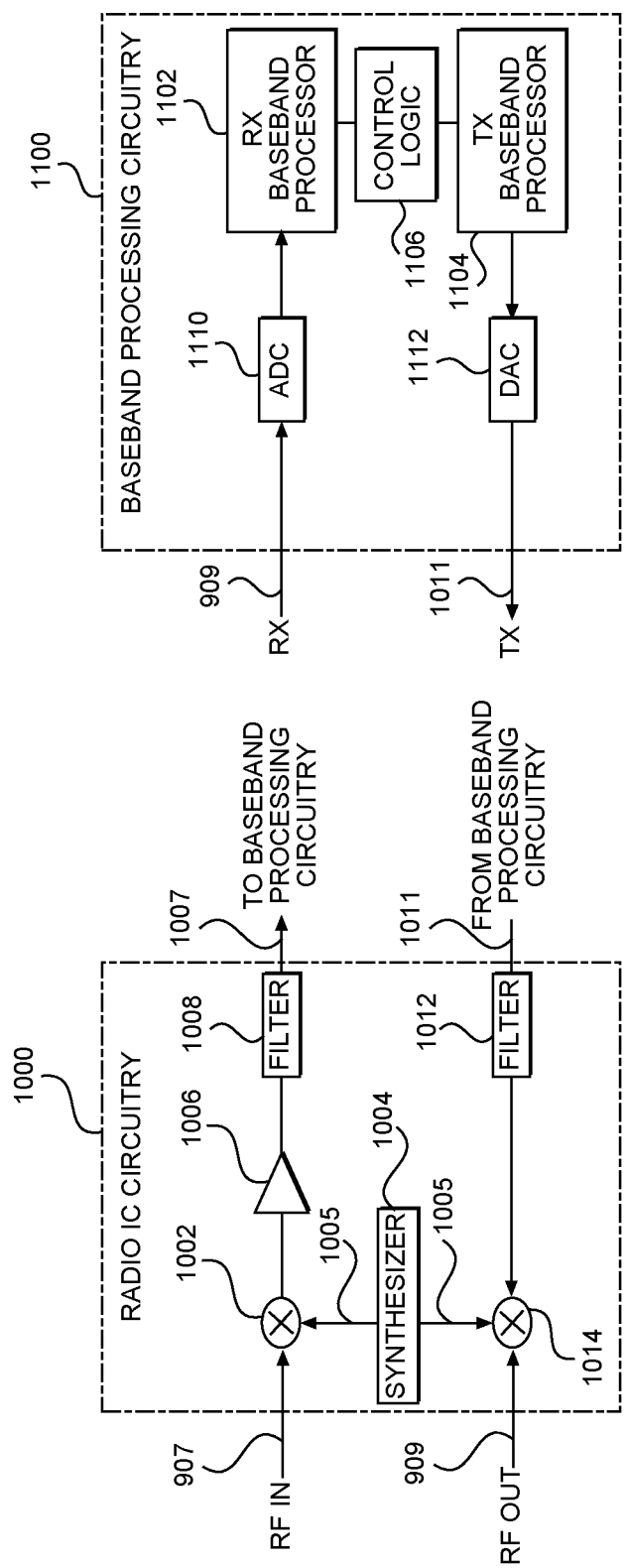

TRIGGER FRAMES FOR RANGE ESTIMATION IN WIRELESS LOCAL AREA NETWORK (WLAN)

PRIORITY CLAIM

This application is a U.S. National Stage Filing under 35 U.S.C. 371 from International Application No. PCT/US2017/025282, filed on Mar. 31, 2017, and published as WO 2018/106274 on Jun. 14, 2018, which application claims the benefit of priority to U.S. Provisional Patent Application No. 62/430,986 entitled "Trigger Frames for Range Estimation In Wireless Local Area. Network (WLAN)", filed Dec. 7, 2016, which applications are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the Institute of Electrical and Electronic Engineers (IEEE) 802.11 family of standards. Some embodiments relate to IEEE 802.11ax. Some embodiments relate to IEEE 802.11az. Some embodiments relate to methods, computer readable media, and apparatus for trigger frames for range estimation in wireless local area network (WLAN).

BACKGROUND

Efficient use of the resources of a wireless local-area network (WLAN) is important to providing bandwidth and acceptable response times to the users of the WLAN. However, often there are many devices trying to share the same resources, and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 6 illustrates an example of a common information field with a trigger frame, in accordance with some embodiments;

FIG. 7 illustrates a table of trigger type subfield encoding, in accordance with some embodiments;

FIG. 10 illustrates a radio integrated circuit (IC) circuitry for use in the radio architecture of FIG. 8 in accordance with some embodiments;

FIG. 11 illustrates a baseband processing circuitry for use in the radio architecture of FIG. 8 in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
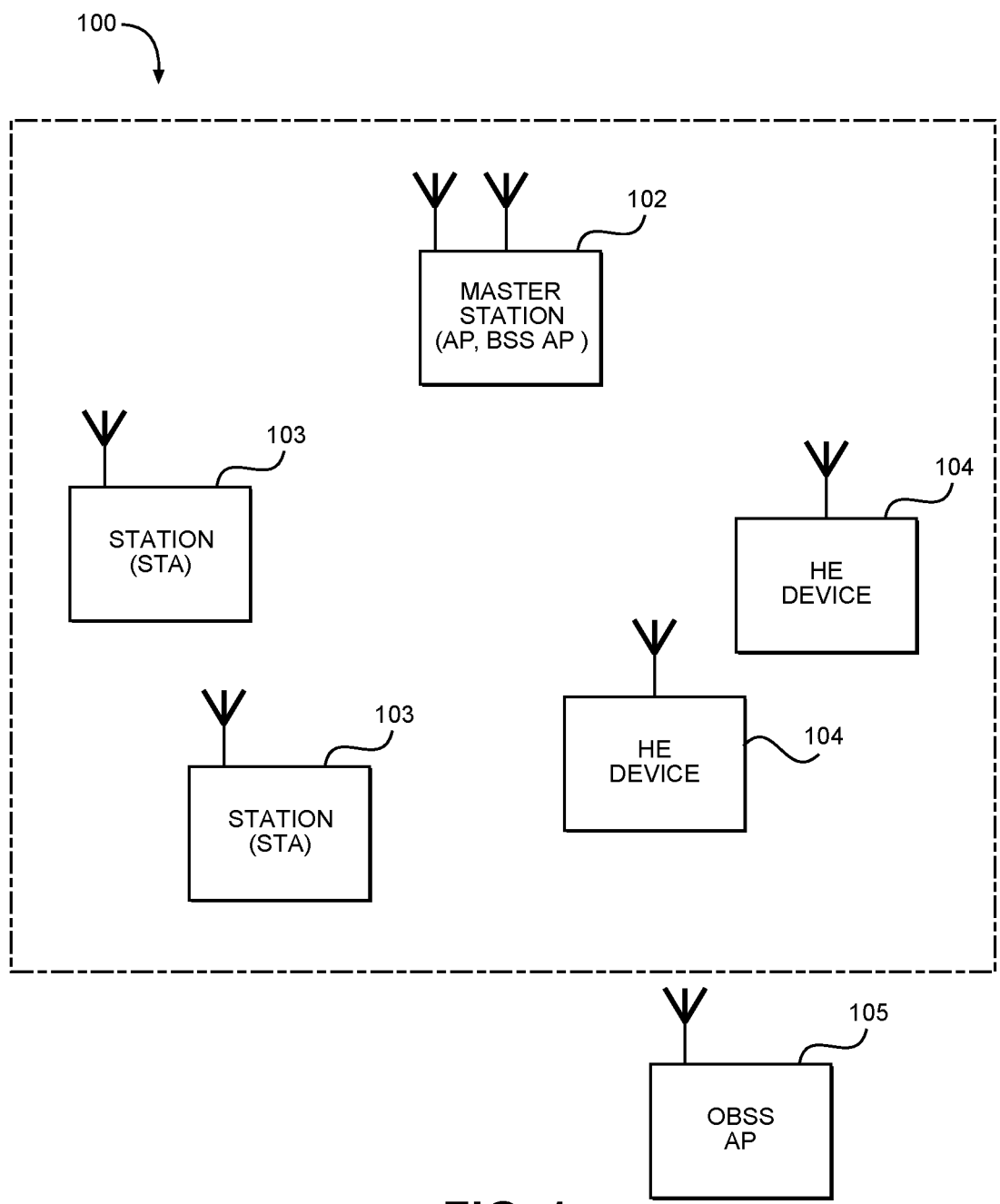
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support HE devices in some cases, non-HE devices in some cases, and a combination of HE devices and non-HE devices in some cases. Accordingly, it is understood that although techniques described herein may refer to either a non-HE device or to an HE device, such techniques may be applicable to both non-HE devices and HE devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may receive and/or detect signals from one or more STAs 103, and may transmit data packets to one or more STAs 103. These embodiments will be described in more detail below.

In some embodiments, the AP 102 may be a basic service set (BSS) AP 102 configured to communicate with the STAs 103 as part of an extended service set (ESS) network (100 in this example). That is, in an embodiment, the network 100 is an ESS network. One or more overlapping BSS (OBSS) APs 105 may be operational but not part of the ESS network 100, and may provide interference to the STA 103. In some embodiments, the OBSS APs 105 may be devices with which the STA 103 may not necessarily communicate. For instance, the STA 103 may not be associated with the OBSS APs 105 in some cases, but may still detect/receive packets from the OBSS APs 105. It should be noted that the OBSS AP 105 is illustrated as being outside of the ESS network 100 geographically in this example, but this is not limiting. In some cases, the OBSS APs 105 may be located within a coverage area of the ESS network 100 (and/or BSS APs of the ESS network 100). These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HE device 104 and/or other device may be configurable to operate as a master station. Accordingly, in such embodiments, operations that may be performed by the AP 102 as described herein may be performed by the STA 103, HE device 104 and/or other device that is configurable to operate as the master station.

In some embodiments, one or more of the STAs 103 may be legacy stations. These embodiments are not limiting, however, as the STAs 103 may be configured to operate as HE devices 104 or may support HE operation in some embodiments. The master station 102 may be arranged to communicate with the STAs 103 and/or the HE devices 104 in accordance with one or more of the IEEE 802.11 standards, including 802.11ax and/or others. In accordance with some HE embodiments, an access point (AP) may operate as the master station 102 and may be arranged to contend for a wireless medium (e.g., during a contention period) to receive exclusive control of the medium for an HE control period (i.e., a transmission opportunity (TXOP)). The master station 102 may, for example, transmit a master-sync or control transmission at the beginning of the HE control period to indicate, among other things, which HE devices 104 are scheduled for communication during the HE control period. During the HE control period, the scheduled HE devices 104 may communicate with the master station 102 in accordance with a non-contention-based multiple access technique. This is unlike conventional Wi-Fi communications in which devices communicate in accordance with a contention-based communication technique, rather than a non-contention-based multiple access technique. During the HE control period, the master station, e.g., AP 102, may communicate with HE devices 104 using one or more HE PPDUs. During the HE control period, STAs 103 not operating as HE devices 104 may refrain from communicating in some cases. In some embodiments, the master-sync transmission may be referred to as a control and schedule transmission.

In some embodiments, the multiple-access technique used during the HE control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE devices 104 outside the HE control period in accordance with legacy IEEE 802.11 communication techniques, although this is not a requirement.

In some embodiments, the HE communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HE communication may be configured for transmitting a number of spatial streams.

In some embodiments, high-efficiency (HE) wireless techniques may be used, although the scope of embodiments is not limited in this respect. As an example, techniques included in 802.11ax standards and/or other standards may be used. In accordance with some embodiments, a master station (e.g., an AP 102) and/or HE devices 104 may generate an HE packet in accordance with a short preamble format or a long preamble format. The HE packet may comprise a legacy signal field (L-SIG) followed by one or more HE signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the term "HE" may be used to refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
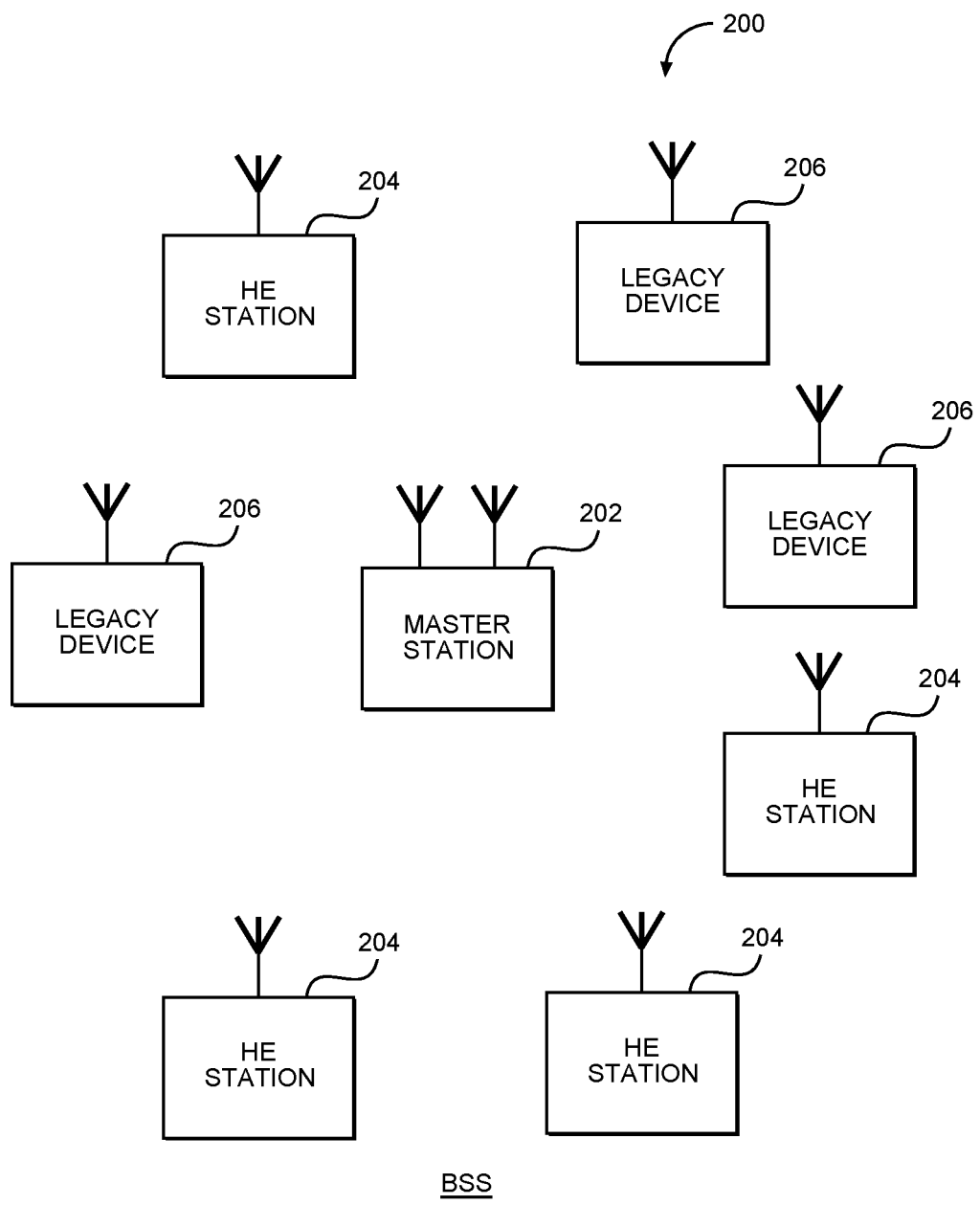
FIG. 2 illustrates a WLAN, in accordance with some embodiments.

FIG. 2 illustrates a WLAN in accordance with some embodiments. The WLAN may comprise a basic service set (BSS) 200 that may include a master station 202, which may be an AP, such as AP 102; a plurality of high-efficiency (HE) (e.g., IEEE 802.11ax) stations 204; and a plurality of legacy (e.g., IEEE 802.11n/ac) devices 206.

The master station 202 may be an AP using one of the IEEE 802.11 protocols to transmit and receive. The master station 202 may be a base station. The master station 202 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 202 and/or HE station 204 may use one or both of MU-MIMO and OFDMA. There may be more than one master station 202 that is part of an extended service set (ESS). A controller (not illustrated) may store information that is common to the one or more master stations 202. The controller may have access to an external network such as the Internet.

The legacy devices 206 may operate in accordance with one or more of IEEE 802.11 a/b/g/n/ac/ad/af/ah/aj, or another legacy wireless communication standard. The legacy devices 206 may be STAs or IEEE 802.11 STAs. The HE stations (HE STAs) 204 may be wireless transmit and receive devices such as a cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol such as, for example IEEE 802.11az. In some embodiments, the HE stations 204, master station 202, and/or legacy devices 206 may be termed wireless devices. In some embodiments the HE station 204 may be a "group owner" (GO) for peer-to-peer modes of operation, where the HE station 204 may perform some operations of a master station 202. In some embodiments, the HE STAs 204 may be termed high efficiency (HE) stations.

The master station 202 may communicate with legacy devices 206 in accordance with legacy IEEE 802.11 communication techniques. In example embodiments, the master station 202 may also be configured to communicate with HE stations 204 in accordance with legacy IEEE 802.11 communication techniques.

In some embodiments, a HE frame may be configurable to have the same bandwidth as a channel.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof, or another bandwidth that is less or equal to the available bandwidth may also be used. In some embodiments the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments the bandwidth of the channels are 26, 52, 104, 242, etc., active data subcarriers or tones that are spaced 20 MHz apart. In some embodiments the bandwidth of the channels is 256 tones spaced by 20 MHz. In some embodiments, a 20 MHz channel may comprise 256 tones for a 256 point Fast Fourier Transform (FFT). In some embodiments, a different number of tones is used. In some embodiments, the orthogonal frequency division multiple-access (OFDMA) structure consists of a 26-subcarrier resource unit (RU), 52-subcarrier RU, 106-subcarrier RU, 242-subcarrier RU, 484-subcarrier RU, and 996-subcarrier RU. Resource allocations for single user (SU) consist of a 242 subcarrier RU, 484-subcarrier RU, 996-subcarrier RU, and 2x996-subcarrier RU.

A HE frame may be configured for transmitting a number of spatial streams, which may be in accordance with MU-MIMO. In some embodiments, a HE frame may be configured for transmitting in accordance with one or both of OFDMA and MU-MIMO. In other embodiments, the master station 202, HE station 204, and/or legacy device 206 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 202 may operate as a master station that may be arranged to contend for a wireless medium (e.g., during a contention period) to receive exclusive control of the medium for an HE control period. In some embodiments, the HE control period may be termed a TXOP. The master station 202 may transmit a HE master-sync transmission, which may be a trigger frame or HE control and schedule transmission, at the beginning of the HE control period. The master station 202 may transmit a time duration of the TXOP and channel information. During the HE control period, HE stations 204 may communicate with the master station 202 in accordance with a non-contention-based multiple access technique such as OFDMA and/or MU-MIMO. This is unlike conventional WLAN communications in which devices communicate in accordance with a contention-based communication technique, rather than a multiple access technique. During the HE control period, the master station 202 may communicate with HE stations 204 using one or more HE frames. During the HE control period, the HE STAs 204 may operate on a channel smaller than the operating range of the master station 202. During the HE control period, legacy stations refrain from communicating.

In accordance with some embodiments, during the master-sync transmission the HE STAs 204 may contend for the wireless medium with the legacy devices 206 being excluded from contending for the wireless medium during the master-sync transmission or TXOP. In some embodiments the trigger frame may indicate an uplink (UL) UL-MU-MIMO and/or UL OFDMA control period. In some embodiments, the trigger frame may indicate portions of the TXOP that are contention-based for some HE station 204 and portions that are not contention based.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In example embodiments, the HE station 204 and/or the master station 202 are configured to perform the methods and operations herein described in conjunction with FIGS. 3-13.

In some embodiments, the systems, devices, and methods described herein describe several trigger frame formats for the next generation positioning protocol in WLAN (IEEE 802.11az). In some embodiments of the IEEE 802.11az specification, it has been agreed that the protocol should include three phases: the capability discover, the measurement parameter negotiation, and the measurement exchange. Also, the measurement parameter negotiation phase should support multiuser (MU) mode for both associated and unassociated STAs.

In some embodiments, in the MU mode, all the associated and unassociated STAs may transmit packets to the AP simultaneously, and if the uplink transmission of the STAs is not synchronized, then, when the AP decodes these uplink packets, there may exist inter-STA interference. To synchronize the uplink transmission from STAs to AP, the trigger frame was proposed in IEEE 802.11ax. In IEEE 802.11ax, there are seven types of trigger frames. For example, there is a trigger frame for uplink data packet transmission, a trigger frame for beamforming channel state information (CSI) feedback, and a trigger frame for a buffer status report of an STA. In some examples, the feedback may include beam-forming measurements related to one or more links between the AP and the STAs. In some embodiments, the feedback may be received according to channel resource allocations for the STAs included in the trigger frames.

In some embodiments, the trigger frame is a medium access control (MAC) frame which contains sufficient information to identify the STAs that will transmit the uplink packet after a short interframe space (SIFS) of receiving the trigger frame. An SIFS is the amount of time (e.g., in microseconds) that is needed for a wireless interface to process a received frame and to respond with a response frame. In some embodiments, the trigger frame also carries the resource allocation information for the STA uplink packet transmission.

In some embodiments, in IEEE 802.11ax, the trigger frames are designed for associated STAs, and the association identifier (AID) is used to identify the STAs; the channel sounding protocol only estimates the AP to STA channel. However, in IEEE 802.11az, the negotiation and measurement protocol should support both associated and unassociated STAs, and the measurement protocol also needs to support the bidirectional channel sounding between an AP and STAs; these new features in IEEE 802.11az specify new types of trigger frames to be defined for the uplink MU packets transmission.

In some embodiments, the systems, devices, and methods described herein provide new designs for trigger frames, which enable an AP to support associated and unassociated STAs using MU mode in the parameter negotiation and measurement exchange phases (e.g., for channel measurement). In some embodiments, the new trigger frames enables an AP to exchange the parameter negotiation packets and measurement packets with multiple associated and unassociated STAs simultaneously. Also, the AP may use the new trigger frame to check the readiness of the associated and unassociated STAs. After an SIFS of receiving the trigger frame, the STAs may transmit the uplink packets to the AP.

In some embodiments of the IEEE 802.11az protocol, there is no discussion about the trigger frame for the parameter negotiation and measurement exchange between the AP and associated and unassociated STAs.

In some embodiments, there are several design considerations that may include one or more of the following:

(1) In some embodiments, to guarantee the efficiency of the protocol, before an AP initiates the negotiation and measurement protocols, the AP needs to know whether STAs are ready for the negotiation or measurement protocols (e.g., ready for channel measurement). According to these embodiments, the AP may not allocate resources to the STAs that are not ready.

(2) In the negotiation phase of IEEE 802.11az, both associated STAs and unassociated STAs need to be supported. In this negotiation phase, an association identifier (AID) may be used to identify the associated STAs, and for the unassociated STAs, a pre-AID may be used as the identity.

(3) In the measurement protocol of IEEE 802.11az, to calculate the round trip time between AP and STA, both AP-to-STA channels and STA-to-AP channels need to be estimated. In embodiments, the trigger frame is able to trigger a bidirectional channel sounding between the AP and multiple associated and unassociated STAs.

In some embodiments, based on one or more of the above-listed considerations, systems, devices, and methods described herein provide three types of new trigger frames for IEEE 802.11az. According to embodiments, all these three trigger frames use AID and pre-AID to identify associated and unassociated STAs. In some embodiments, in accordance with the IEEE 802.11ax draft 1.0 specification, the frame format of trigger frame is defined as in FIG. 3, which is described below.

Figure 3:
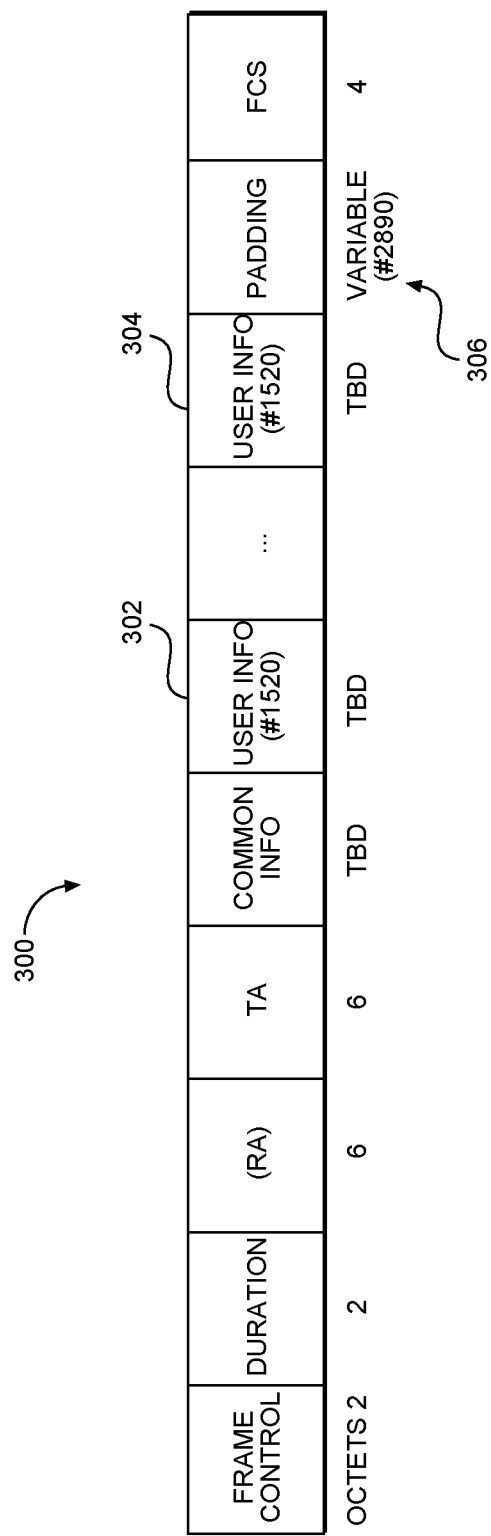
FIG. 3 illustrates an example of a trigger frame format, in accordance with some embodiments.

FIG. 3 illustrates an example 300 of a frame format of a trigger frame for range estimation, in accordance with some embodiments. As shown, example 300 of the frame format of the trigger frame includes user information fields 302 and 304, and a variable 306. FIG. 3 illustrates an example 300 where, in the user information fields 302 and 304, an AID is used to identify the associated STAs. In some embodiments, in the new defined trigger frames described below, the user information fields 302 and 304 support both AID and pre-AID to identify the associated and unassociated STAs. The example 300 may be used for distance estimations (e.g., ranging) from the STAs to an AP.

Detailed descriptions of example embodiments of the three new trigger frames are listed below:

Case 1: In some embodiments, a trigger frame may be used to check the readiness of STAs. According to some such embodiments, after an SIFS of receiving this type of trigger frame, associated and unassociated STAs that are polled by the trigger frame may send an uplink feedback to the AP to indicate whether the STAs are ready for negotiation or measurement exchange (e.g., ready for channel measurement). For example, this feedback could be a short null data packet (NDP) feedback. In accordance with this example embodiment, each STA is allocated a resource unit during the short NDP feedback packet and the STA may use this resource unit to report its status to the AP.

Case 2: In some embodiments, a trigger frame may be used for the negotiation phase (e.g., for channel measurement). According to some such embodiments, after an SIFS of receiving this type of trigger frame, the associated and unassociated STAs that are polled by the trigger frame will send an uplink negotiation packet to the AP, and the negotiation packet includes the parameter fields that relate to the measurement exchange, for example, antenna configurations and bandwidth.

Case 3: In some embodiments, a trigger frame may be used for the measurement phase. According to some such embodiments, a case 3 trigger frame may trigger a sequence of packets for channel sounding and measurement information exchange. After receiving this type of trigger frame, an STA sends an uplink sounding NDP to the AP, and the AP then sends a downlink sounding NDP to STA, such that the STA-to-AP and AP-to-STA channels may be estimated. This trigger frame may also include the information related to the channel state information feedback, such as, for example, the number of subcarriers and the codebook size. After the transmission of downlink and uplink sounding NDP, the STA and AP may exchange CSI using the format defined by the trigger frame.

Figure 4:
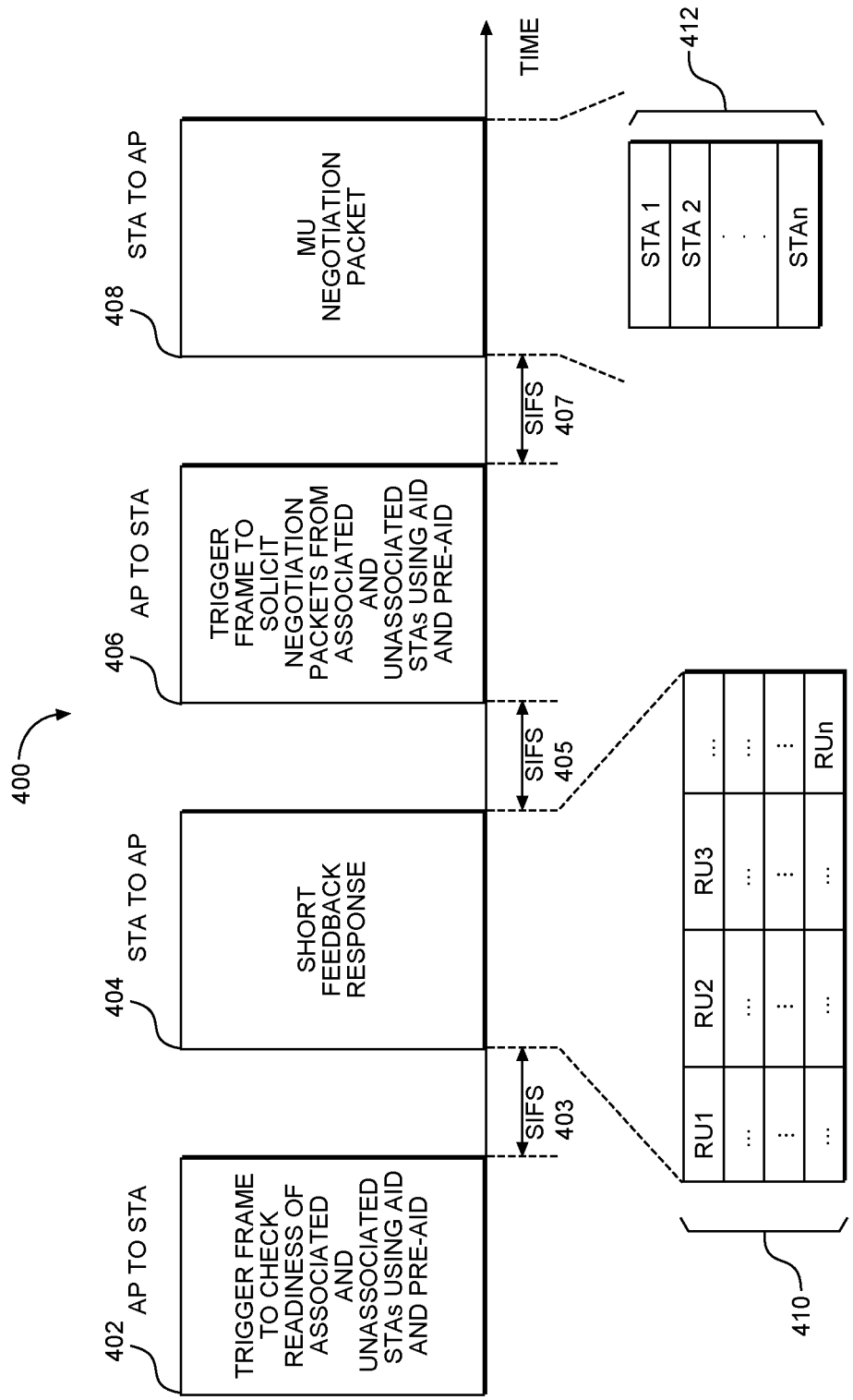
FIG. 4 illustrates an example scenario of using a trigger frame to check the readiness of stations (STAs) and using a trigger frame for the negotiation phase, in accordance with some embodiments.

FIG. 4 illustrates an example scenario 400 including a trigger frame used to check the readiness of STAs and a trigger frame used for the negotiation phase, in accordance with some embodiments. In the example scenario 400, the trigger frame may be used to check the readiness of the STAs and another trigger frame may be used for the negotiation phase. In particular, the scenario 400 provided in FIG. 4 depicts a use case of the case 1 embodiment of the trigger frames used to check the readiness of STAs and case 2 embodiment of the trigger frames used for the negotiation phase.

As shown in FIG. 4, an example timeline for using the case 1 and case 2 triggers frames in the negotiation phase includes transmissions between an AP and STAs at times 402, 404, 406, and 408. These transmissions are described in the following paragraphs. It should be noted that the scenario 400 may serve to illustrate some or all of the concepts and techniques described herein, but embodiments are not limited to the example scenario 400. For instance, embodiments are not limited to the number of STAs and APs shown, and are also not limited to the number or type of frames or transmissions shown (e.g., 410 and 412). Embodiments are also not limited to the ordering, arrangement and timing of the frames and transmissions as shown in FIG. 4. It should also be noted that some embodiments may include fewer frames and transmissions than what is shown in FIG. 4. Some embodiments may include additional frames or other elements not shown in FIG. 4.

At time 402, an AP may send a case 1 trigger frame to associated and unassociated STAs that want to do range estimation (i.e., ranging). The example scenario 400 may be used to estimate distances (e.g., ranging) from STAs to an AP. As shown, at time 402, the AID and pre-AID may be used to identify the STAs and allocate the resource. For example, each STA is allocated a resource unit defined over space and time.

After the SIFS 403 time of the STA receiving the case 1 trigger frame from the AP, the STA will send an uplink (UL) short NDP packet to the AP.

At time 404, the STAs transmit an UL short feedback packet (e.g., a short feedback response). As shown, transmission 410 may be sent at time 404, and in the transmission 410, the STAs answer with a "Yes" or "No" on the allocated resource unit. If the STAs are ready for negotiation with the AP, the STAs will respond "Yes". For example, STAs that are ready for negotiation may send energy on the allocated resource unit (RU). Otherwise, the STAs will not transmit a signal on the allocated RU. As shown in FIG. 4, the transmission 410 may indicate "Yes" or "No" responses for allocated resource units (e.g., RU1, RU2, RU3). It should be noted that the use of the SIFS 403 here and elsewhere in FIG. 4 (405, 407) is not limiting, as other time intervals may be used in some cases.

After a SIFS 405 has elapsed, at time 406, the AP may send a case 2 trigger frame to solicit a negotiation packet. For example, after the SIFS time 405 of the AP receiving the short feedback response (i.e., after the AP receives the short feedback packets from STAs), the AP will solicit negotiation packets from the STAs. That is, at time 406, the AP may send a case 2 trigger frame to solicit the negotiation packets (e.g., MU negotiation packets) from the associated and unassociated STAs with positive feedback. As shown, the AID and pre-AID may be used to allocate the resource for the STAs to send negotiation packets.

After a SIFS 407 has elapsed, at time 408, negotiation packets may be sent from the STAs to the AP. For instance, after the SIFS 407 of receiving the case 2 trigger frame, the STA will send a negotiation packet to the AP. As shown in FIG. 4, a transmission 412 may be sent at time 408; the transmission 412 may include MU negotiation packets from the STAs. For example, at the time 408, the MU-negotiation packet may be sent from the STAs to the AP.

Figure 5:
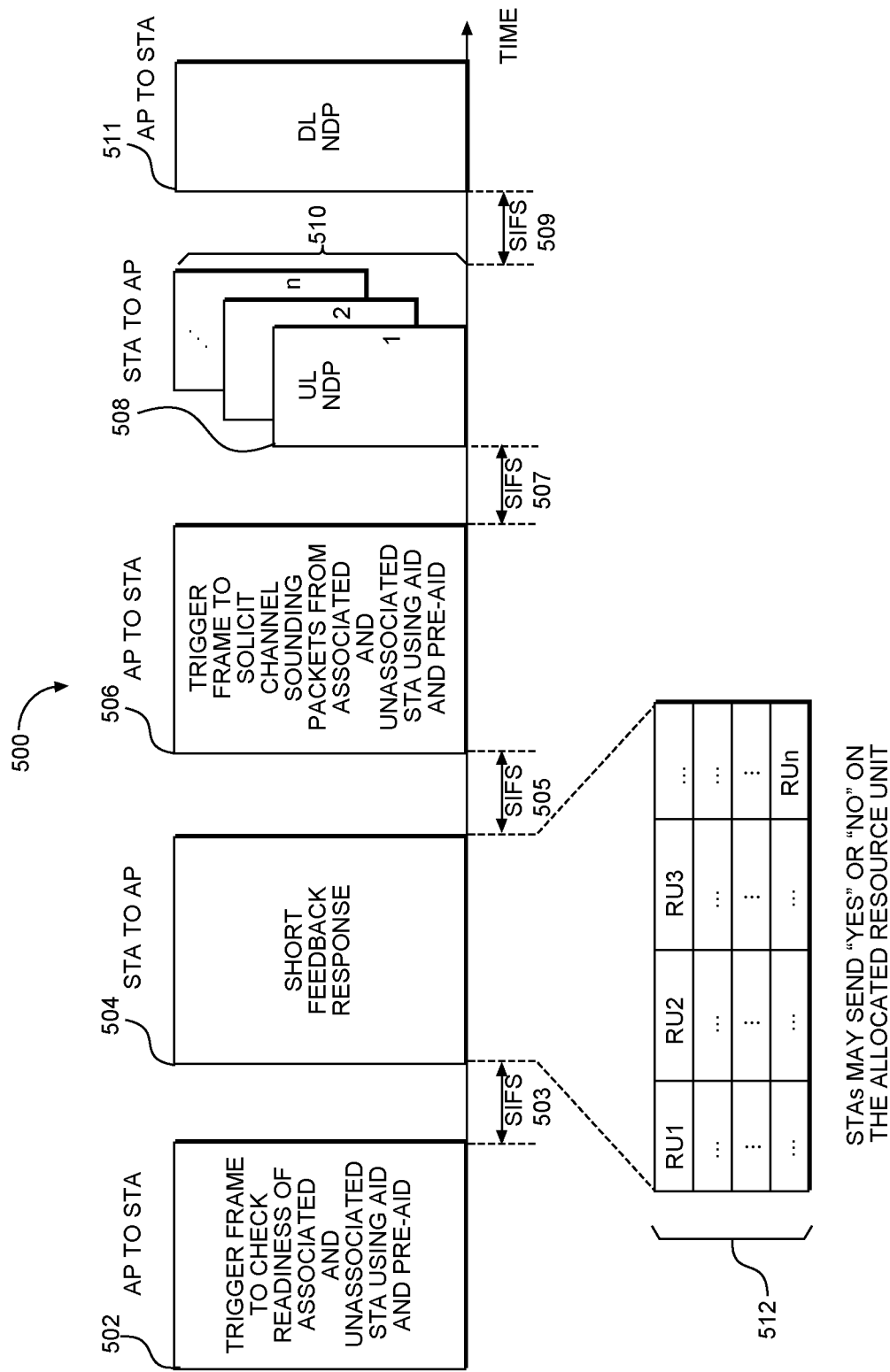
FIG. 5 illustrates an example scenario of using a trigger frame to check the readiness of STAs and using a trigger frame for the measurement phase, in accordance with some embodiments.

FIG. 5 illustrates an example scenario 500 of using a trigger frame to check the readiness of the STAs and a using a trigger frame for the measurement phase, in accordance with some embodiments. In particular, the example scenario 500 illustrates a use case of the case 1 and case 3 trigger frames embodiments in the measurement phase. As shown, the scenario 500 includes transmissions between an AP and STAs at times 502, 504, 506, 508, and 511. It should be noted that the scenario 500 may serve to illustrate some or all of the concepts and techniques described herein, but embodiments are not limited to the example scenario 500. For instance, embodiments are not limited to the number of STAs and APs shown, and are also not limited to the number or type of transmissions and frames shown (UL NDP, DL NDP or other). Embodiments are also not limited to the ordering, arrangement, and timing of the frames as shown in FIG. 5. It should also be noted that some embodiments may include fewer frames than what is shown in FIG. 5. Some embodiments may include additional transmissions or frames or other elements not shown in FIG. 5.

Similar to the example scenario 400 in FIG. 4 described above, in the scenario 500 at time 502, an AP uses a case 1 trigger frame to check whether the STAs are ready for a time of arrival (ToA) measurement. As shown in FIG. 5, at time 502, the AID and pre-AID may be used to identify the STAs and check readiness of the STAs.

After a SIFS 503 has elapsed, at time 504, the STAs transmit a UL short feedback packet (e.g., a short feedback response) to the AP. As shown in FIG. 5, transmission 512 may be sent at time 504, and in the transmission 512, the STAs answer with a "Yes" or "No" on the allocated resource unit (RU). As shown in FIG. 5, the transmission 512 may indicate "Yes" or "No" responses for allocated resource units (e.g., RU1, RU2, RU3). If the STAs are ready for channel measurement with the AP, the STAs will respond "Yes" (e.g., by sending energy on the allocated resource unit). Otherwise, the STAs will not transmit a signal on the allocated resource unit. It should be noted that the use of the SIFS 503 here and elsewhere in FIG. 5 (505, 507, 509) is not limiting, as other time intervals may be used in some cases.

After a SIFS 505 of the AP receiving the short feedback packets from the STAs, the AP will know which STA is ready for channel measurement. Then, at time 506, the AP may send a case 3 trigger frame to solicit the channel sounding packet from the associated and unassociated STAs that answer "Yes" in the short feedback packet. In some embodiments, at time 506, the AID and pre-AID are used in the case 3 trigger frame to allocate a resource for the uplink sounding NDP (UL NDP). For example, the P-matrix may be used for a high-efficiency long training field (HE-LTF) by each STA.

After a SIFS 507 has elapsed, at time 508, the STA may send a UL NDP to the AP and the AP may use UL NDPs 510 to estimate the channel response from the STAs to the AP.

After a SIFS 509 has elapsed, at time 511, the AP may send a downlink (DL) NDP packet, such that the STAs may estimate the channel response from the AP to the STAs. That is, following receiving the UL NDPs 510, after the SIFS 509, the DL NDP may be sent at time 511. After sending the DL NDP at time 511, the AP and the STAs may exchange the channel state information or ToA information using one or two packets. In this way, the STAs or the AP may derive a round-trip time.

FIG. 6 illustrates an example 600 of a common information field (i.e., common info field) of a trigger frame, in accordance with some embodiments. In some embodiments, the common information field may include a trigger type subfield 602. In some embodiments using the IEEE 802.11ax specification, the trigger type subfield 602 may be defined in the common info field of a trigger frame, and as shown in FIG. 6, the trigger type subfield 602 has 4 bits.

FIG. 7 illustrates a table 700 of trigger type subfield encoding, in accordance with some embodiments. In some embodiments, as shown in FIG. 7, seven types 702 of trigger frames are defined under the IEEE 802.11ax specification draft D1.0, with additional trigger frames being reserved. In some embodiments, there are 8-bit values that may be used to indicate new trigger frame types, for example, bit values 7, 8, 9 may be allocated to the above mentioned three example trigger frame types (e.g., cases 1, 2, and 3 described above). That is, in the embodiment of FIG. 7, the types 702 of trigger frames may include the three trigger frame types corresponding to cases 1, 2, and 3. Example definitions 704 of these trigger frame types 702 are provided in FIG. 7 and described below.

For example, bit value 7 may be allocated for the case 1 trigger frame type that may be used to check the readiness of STAs. In some embodiments, after a SIFS of receiving this type of trigger frame (bit value 7), associated and unassociated STAs that are polled by the trigger frame may send an uplink feedback to the AP to indicate whether the STAs are ready for negotiation or measurement exchange (e.g., channel measurement). For example, this feedback could be a short NDP feedback. According to this example embodiment, each STA may be allocated a resource unit during the short NDP feedback packet and the STA may use this resource unit to report its status to the AP.

Also, for example, bit value 8 may be allocated for the case 2 trigger frame type that may be used for the negotiation phase. According to some embodiments, after a SIFS of receiving this type trigger frame (bit value 8), the associated and unassociated STAs that are polled by the trigger frame may send an uplink negotiation packet to the AP, and the negotiation packet includes the parameter fields that relate to the measurement exchange, such as, for example, antenna configurations and bandwidth.

Further, for example, bit value 9 may be allocated for the case 3 trigger frame type that may be used for the measurement phase. According to some embodiments, this type of trigger frame (bit value 9) may trigger a sequence of packets for channel sounding and measurement information exchange. After receiving this type of trigger frame, an STA may send an uplink sounding NDP to the AP, and the AP then sends a downlink sounding NDP to STA, such that the STA-to-AP and AP-to-STA channels may be estimated. This trigger frame may also include the information related to the channel state information feedback, such as, for example, the number of subcarriers and the codebook size. After the transmission of downlink and uplink sounding NDP, the STA and AP may exchange CSI using the format defined by the trigger frame.

Figure 8:
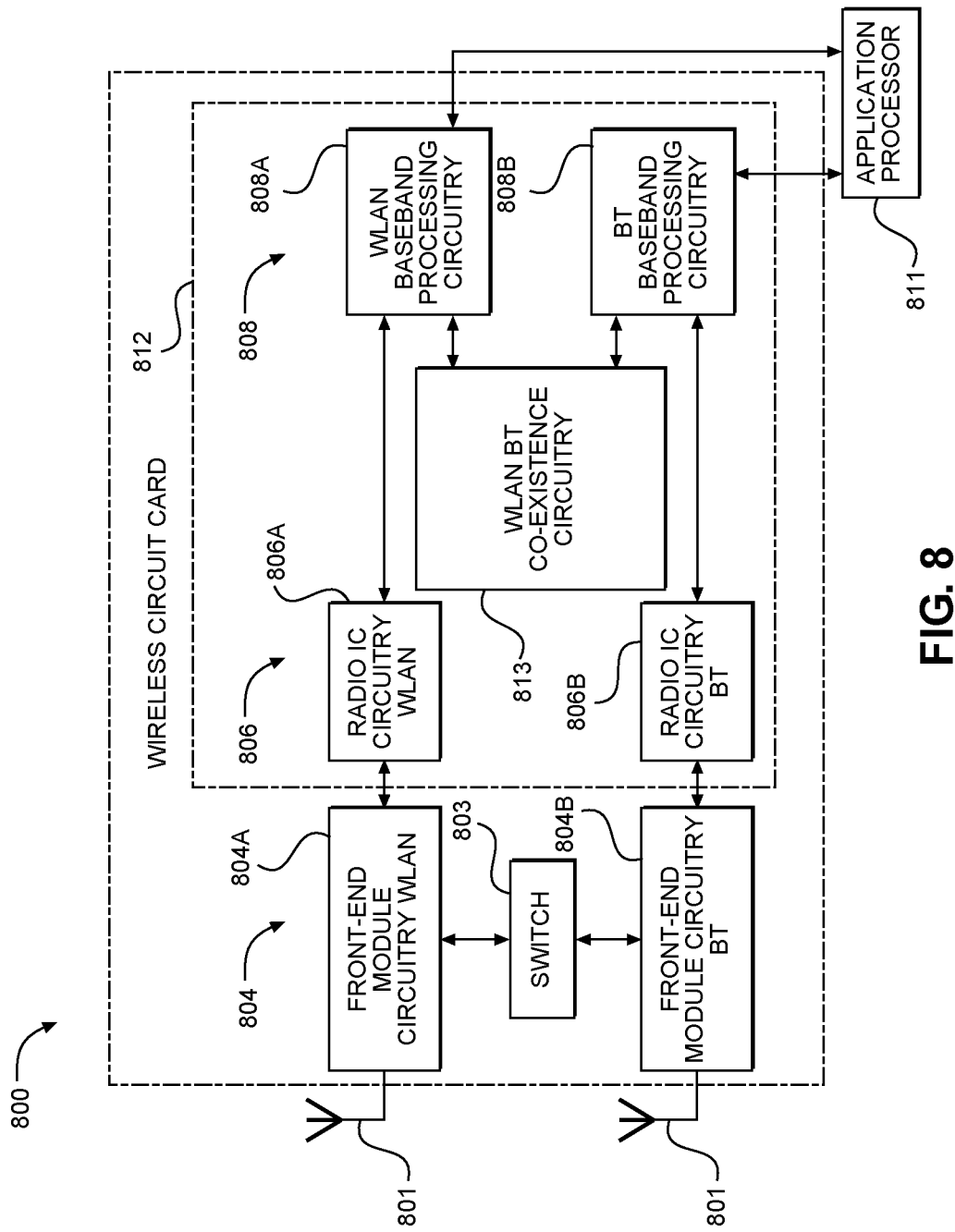
FIG. 8 is a block diagram of a radio architecture in accordance with some embodiments.

FIG. 8 is a block diagram of a radio architecture 800 in accordance with some embodiments. Radio architecture 800 may include radio front-end module (FEM) circuitry 804, radio IC circuitry 806 and baseband processing circuitry 808. Radio architecture 800 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804 may include a WLAN or Wi-Fi FEM circuitry 804A and a Bluetooth (BT) FEM circuitry 804B. The WLAN FEM circuitry 804A may include a receive signal path comprising circuitry configured to operate on WLAN RF signals received from one or more antennas 801, to amplify the received signals and to provide the amplified versions of the received signals to the WLAN radio IC circuitry 806A for further processing. The BT FEM circuitry 804B may include a receive signal path which may include circuitry configured to operate on BT RF signals received from one or more antennas 802, to amplify the received signals and to provide the amplified versions of the received signals to the BT radio IC circuitry 806B for further processing. FEM circuitry 804A may also include a transmit signal path which may include circuitry configured to amplify WLAN signals provided by the radio IC circuitry 806A for wireless transmission by one or more of the antennas 801. In addition, BT FEM circuitry 804B may also include a transmit signal path which may include circuitry configured to amplify BT signals provided by the BT radio IC circuitry 806B for wireless transmission by the one or more antennas. In the embodiment of FIG. 8, although FEM circuitry 804A and BT FEM circuitry 804B are shown as being distinct from one another, embodiments are not so limited, and include within their scope the use of a FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806 as shown may include WLAN radio IC circuitry 806A and BT radio IC circuitry 806B. The WLAN radio IC circuitry 806A may include a receive signal path, which may include circuitry to down-convert WLAN RF signals received from the WLAN FEM circuitry 804A and provide baseband signals to WLAN baseband processing circuitry 808A. BT radio IC circuitry 806B may in turn include a receive signal path, which may include circuitry to down-convert BT RF signals received from the BT FEM circuitry 804B and provide baseband signals to BT baseband processing circuitry 808B. WLAN radio IC circuitry 806A may also include a transmit signal path, which may include circuitry to up-convert WLAN baseband signals provided by the WLAN baseband processing circuitry 808A and provide WLAN RF output signals to the WLAN FEM circuitry 804A for subsequent wireless transmission by the one or more antennas 801. BT radio IC circuitry 806B may also include a transmit signal path, which may include circuitry to up-convert BT baseband signals provided by the BT baseband processing circuitry 808B and provide BT RF output signals to the BT FEM circuitry 804B for subsequent wireless transmission by the one or more antennas 801. In the embodiment of FIG. 8, although radio IC circuitries 806A and 806B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 808 may include a WLAN baseband processing circuitry 808A and a BT baseband processing circuitry 808B. The WLAN baseband processing circuitry 808A may include a memory, such as, for example, a set of RAM arrays in a Fast Fourier Transform or Inverse Fast Fourier Transform block (not shown) of the WLAN baseband processing circuitry 808A. Each of the WLAN baseband processing circuitry 808A and the BT baseband processing circuitry 808B may further include one or more processors and control logic to process the signals received from the corresponding WLAN or BT receive signal path of the radio IC circuitry 806, and also to generate corresponding WLAN or BT baseband signals for the transmit signal path of the radio IC circuitry 806. Each of the baseband processing circuitries 808A and 808B may further include physical layer (PHY) and medium access control layer (MAC) circuitry, and may further interface with an application processor 811 for generation and processing of the baseband signals and for controlling operations of the radio IC circuitry 806.

Referring still to FIG. 8, according to the shown embodiment, WLAN-BT coexistence circuitry 813 may include logic providing an interface between the WLAN baseband processing circuitry 808A and the BT baseband processing circuitry 808B to enable use cases requiring WLAN and BT coexistence. In addition, a switch 803 may be provided between the WLAN FEM circuitry 804A and the BT FEM circuitry 804B to allow switching between the WLAN and BT radios according to application needs. In addition, although the antennas 801 are depicted as being respectively connected to the WLAN FEM circuitry 804A and the BT FEM circuitry 804B, embodiments include within their scope the sharing of one or more antennas 801 as between the WLAN and BT FEMs, or the provision of more than one antenna 801 connected to each of FEM circuitry 804A or 804B.

In some embodiments, the front-end module circuitry 804, the radio IC circuitry 806, and baseband processing circuitry 808 may be provided on a single radio card, such as wireless circuit card 812. In some other embodiments, the one or more antennas 801, the FEM circuitry 804 and the radio IC circuitry 806 may be provided on a single radio card. In some other embodiments, the radio IC circuitry 806 and the baseband processing circuitry 808 may be provided on a single chip or integrated circuit (IC), such as wireless circuit card 812.

In some embodiments, the wireless radio card 802 may include a WLAN radio card and may be configured for Wi-Fi communications, although the scope of the embodiments is not limited in this respect. In some of these embodiments, the radio architecture 800 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 800 may be part of a Wi-Fi communication station (STA) such as a wireless access point (AP), a base station or a mobile device including a Wi-Fi device. In some of these embodiments, radio architecture 800 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 800 may also be suitable to transmit and/or receive communications in accordance with other techniques and standards.

In some embodiments, the radio architecture 800 may be configured for high-efficiency (HE) Wi-Fi communications in accordance with the IEEE 802.11ax standard. In these embodiments, the radio architecture 800 may be configured to communicate in accordance with an OFDMA technique, although the scope of the embodiments is not limited in this respect.

In some other embodiments, the radio architecture 800 may be configured to transmit and receive signals using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 8, the BT baseband processing circuitry 808B may be compliant with a Bluetooth (BT) connectivity standard such as Bluetooth, Bluetooth 4.0 or Bluetooth 5.0, or any other iteration of the Bluetooth standard. In embodiments that include BT functionality as shown for example in FIG. 8, the radio architecture 800 may be configured to establish a BT synchronous connection-oriented (SCO) link and/or a BT low energy (BT LE) link. In some of the embodiments that include BT functionality, the radio architecture 800 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 8, the functions of a BT radio card and WLAN radio card may be combined on a single wireless radio card, such as single wireless radio card 812, although embodiments are not so limited, and include within their scope discrete WLAN and BT radio cards.

In some embodiments, the radio-architecture 800 may include other radio cards, such as a cellular radio card configured for cellular (e.g., 3GPP such as LTE, LTE-Advanced or 5G communications).

In some IEEE 802.11 embodiments, the radio architecture 800 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

Figure 9:
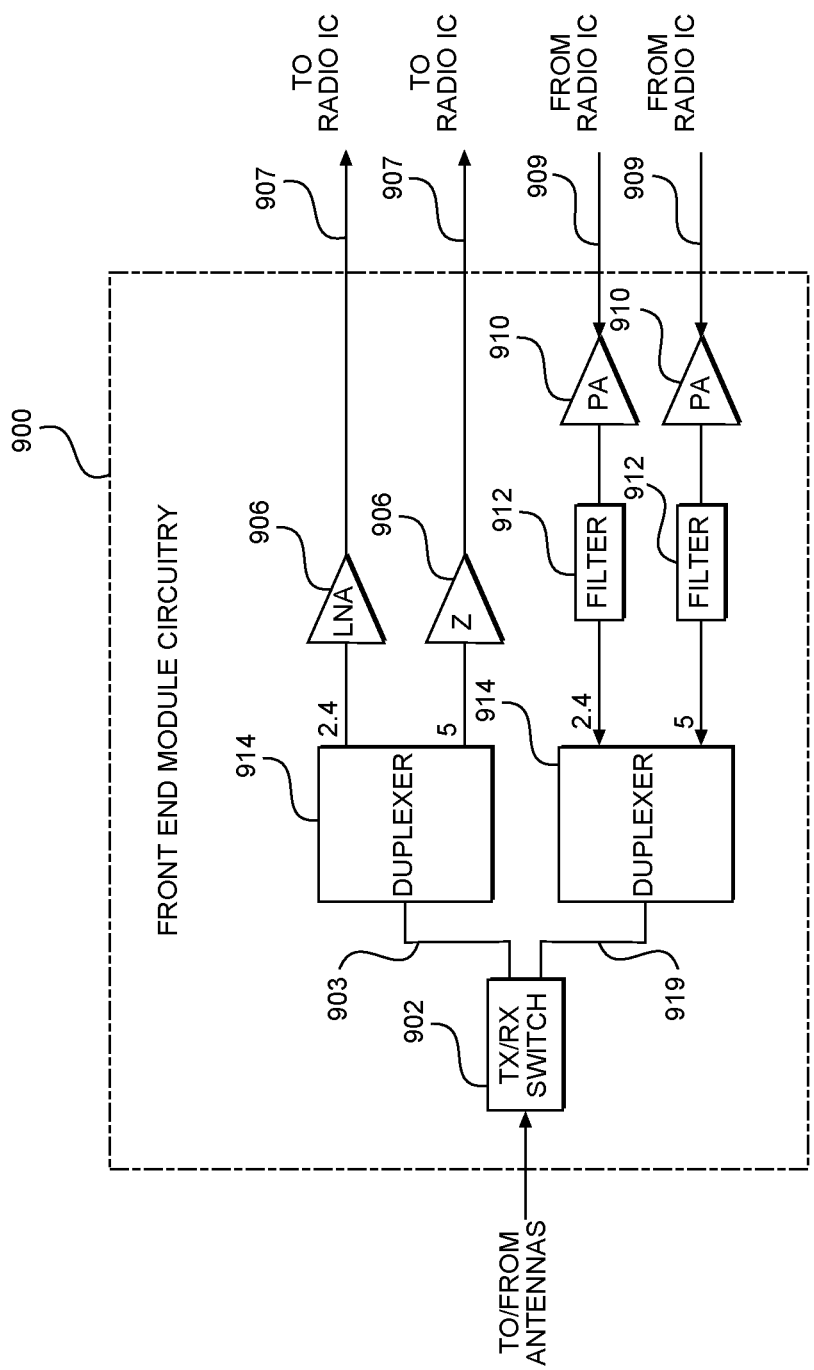
FIG. 9 illustrates a front-end module circuitry for use in the radio architecture of FIG. 8 in accordance with some embodiments.

FIG. 9 illustrates front end module (FEM) circuitry 900 in accordance with some embodiments. The FEM circuitry 900 is one example of circuitry that may be suitable for use as the WLAN and/or BT FEM circuitry 804A/804B (FIG. 8), although other circuitry configurations may also be suitable.

In some embodiments, the FEM circuitry 900 may include a TX/RX switch 902 to switch between transmit mode and receive mode operations. The FEM circuitry 900 may include a receive signal path and a transmit signal path. The receive signal path of the FEM circuitry 900 may include a low-noise amplifier (LNA) 906 to amplify received RF signals 903 and provide the amplified received RF signals 907 as an output (e.g., to the radio IC circuitry 806 (FIG. 8)). The transmit signal path of the circuitry 900 may include a power amplifier (PA) 910 to amplify input RF signals 909 (e.g., provided by the radio IC circuitry 806), and one or more filters 912, such as band-pass filters (BPFs), low-pass filters (LPFs) or other types of filters, to generate RF signals 919 for subsequent transmission (e.g., by one or more of the antennas 801 (FIG. 8)).

In some dual-mode embodiments for Wi-Fi communication, the FEM circuitry 900 may be configured to operate in either the 2.4 GHz frequency spectrum or the 5 GHz frequency spectrum. In these embodiments, the receive signal path of the FEM circuitry 900 may include a receive signal path duplexer 914 to separate the signals from each spectrum as well as provide a separate LNA 906 for each spectrum as shown. In these embodiments, the transmit signal path of the FEM circuitry 900 may also include a power amplifier 910 and a filter 912, such as a BPF, a LPF or another type of filter for each frequency spectrum, and a transmit signal path duplexer 914 to provide the signals of one of the different spectrums onto a single transmit path for subsequent transmission by the one or more of the antennas 801 (FIG. 8). In some embodiments, BT communications may utilize the 2.4 GHZ signal paths and may utilize the same FEM circuitry 900 as the one used for WLAN communications.

FIG. 10 illustrates radio IC circuitry 1000 in accordance with some embodiments. The radio IC circuitry 1000 is one example of circuitry that may be suitable for use as the WLAN or BT radio IC circuitry 806A/806B (FIG. 8), although other circuitry configurations may also be suitable.

In some embodiments, the radio IC circuitry 1000 may include a receive signal path and a transmit signal path. The receive signal path of the radio IC circuitry 1000 may include at least mixer circuitry 1002, such as, for example, down-conversion mixer circuitry, amplifier circuitry 1006, and filter circuitry 1008. The transmit signal path of the radio IC circuitry 1000 may include at least filter circuitry 1012 and mixer circuitry 1014, such as, for example, up-conversion mixer circuitry. Radio IC circuitry 1000 may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1002 and/or 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 804 (FIG. 8) based on the synthesized frequency 1005 provided by synthesizer circuitry 1004. The amplifier circuitry 1006 may be configured to amplify the down-converted signals and the filter circuitry 1008 may include a LPF configured to remove unwanted signals from the down-converted signals to generate output baseband signals 1007. Output baseband signals 1007 may be provided to the baseband processing circuitry 808 (FIG. 8) for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 909 for the FEM circuitry 804. The baseband signals 1011 may be provided by the baseband processing circuitry 808 and may be filtered by filter circuitry 1012. The filter circuitry 1012 may include a LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer circuitry 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively. In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 10 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 1005 of synthesizer 1004 (FIG. 10). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF signal 907 (FIG. 9) may comprise a balanced signal, although the scope of the embodiments is not limited in this respect. The I and Q baseband output signals may be provided to low-nose amplifier, such as amplifier circuitry 1006 or filter circuitry 1008 (FIG. 10).

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. A benefit of using a digital synthesizer circuitry is that, although it may still include some analog components, its footprint may be scaled down much more than the footprint of an analog synthesizer circuitry. In some embodiments, frequency input into synthesizer circuitry 1004 may be provided by a voltage controlled oscillator (VCO), although that is not a requirement. A divider control input may further be provided by either the baseband processing circuitry 808 (FIG. 8) or the application processor 811 (FIG. 8) depending on the desired output frequency 1005. In some embodiments, a divider control input (e.g., N) may be determined from a look-up table (e.g., within a Wi-Fi card) based on a channel number and a channel center frequency as determined or indicated by the application processor 811.

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1005 may be a LO frequency ($f_{LO}$).

FIG. 11 illustrates a functional block diagram of baseband processing circuitry 1100 in accordance with some embodiments. The baseband processing circuitry 1100 is one example of circuitry that may be suitable for use as the baseband processing circuitry 808 (FIG. 8), although other circuitry configurations may also be suitable. The baseband processing circuitry 1100 may include a receive baseband processor (RX BBP) 1102 for processing receive baseband signals 909 provided by the radio IC circuitry 806 (FIG. 8) and a transmit baseband processor (TX BBP) 1104 for generating transmit baseband signals 1011 for the radio IC circuitry 806. The baseband processing circuitry 1100 may also include control logic 1106 for coordinating the operations of the baseband processing circuitry 1100.

In some embodiments (e.g., when analog baseband signals are exchanged between the baseband processing circuitry 1100 and the radio IC circuitry 806), the baseband processing circuitry 1100 may include ADC 1110 to convert analog baseband signals received from the radio IC circuitry 806 to digital baseband signals for processing by the RX BBP 1102. In these embodiments, the baseband processing circuitry 1100 may also include DAC 1112 to convert digital baseband signals from the TX BBP 1104 to analog baseband signals.

In some embodiments that communicate OFDM signals or OFDMA signals, such as through baseband processing circuitry 808A, the TX BBP 1104 may be configured to generate OFDM or OFDMA signals as appropriate for transmission by performing an inverse fast Fourier transform (IFFT). The RX BBP 1102 may be configured to process received OFDM signals or OFDMA signals by performing an FFT. In some embodiments, the RX BBP 1102 may be configured to detect the presence of an OFDM signal or OFDMA signal by performing an autocorrelation to detect a preamble, such as a short preamble, and by performing a cross-correlation to detect a long preamble. The preambles may be part of a predetermined frame structure for Wi-Fi communication.

Referring back to FIG. 8, in some embodiments, the antennas 801 (FIG. 8) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio-architecture 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Referring to FIG. 1, in accordance with some embodiments, the STA 103 may receive a trigger frame (TF) in a channel from a basic service set (BSS) AP 102 during a TXOP obtained by the BSS AP 102. The BSS AP 102 may be included in an extended service set (ESS) network. The STA may detect, in the channel, an overlapping basic service set (OBSS) physical layer convergence procedure protocol data unit (PPDU) from an OBSS AP 105. The STA 103 may determine a received OBSS power based at least partly on the OBSS PPDU. The STA 103 may determine, based at least partly on an ESS color parameter included in the OBSS PPDU, whether the OBSS AP 105 is included in the ESS network. If it is determined that the OBSS AP 105 is included in the ESS network, the STA 103 may select a first predetermined value for an OBSS power threshold. If it is determined that the OBSS AP 105 is not included in the ESS network, the STA 103 may select a second predetermined value for the OBSS power threshold. The STA 103 may determine, based at least partly on a comparison between the received OBSS power and the OBSS power threshold, whether to transmit an uplink PPDU to the BSS AP 102 in the channel during the TXOP. These embodiments will be described in more detail below.

Figure 12:
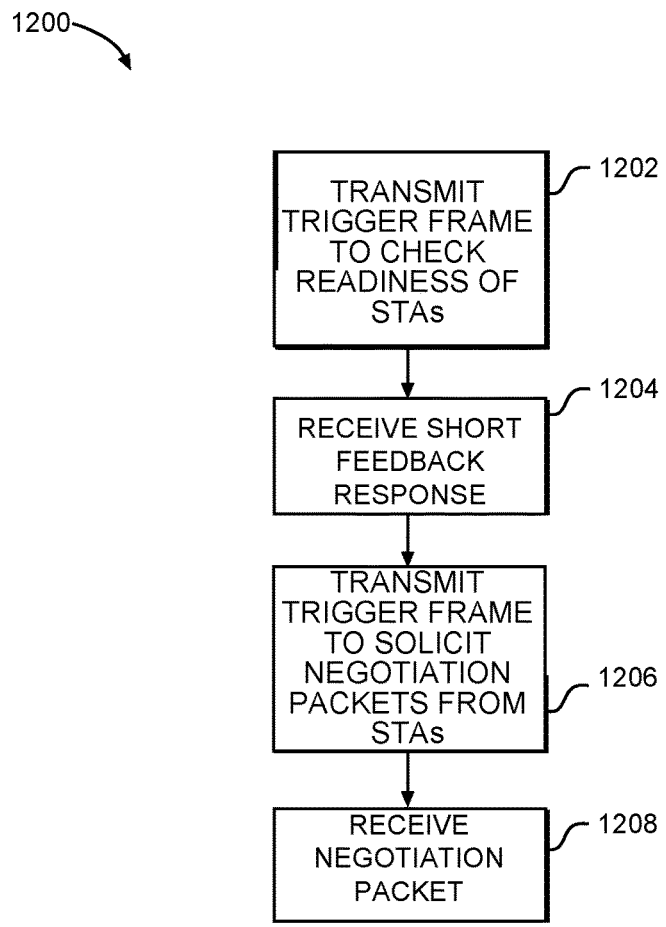
FIG. 12 illustrates the operation of a method of range estimation in accordance with some embodiments.

FIG. 12 illustrates the operation of a method of range estimation in accordance with some embodiments. In particular, FIG. 12 illustrates the operation of a method 1200 of range estimation by using transmissions between an AP and STAs to estimate distances from the STAs to the AP, in accordance with some embodiments. It is important to note that embodiments of the method 1200 may include additional or even fewer operations or processes in comparison to what is illustrated in FIG. 12. In addition, embodiments of the method 1200 are not necessarily limited to the chronological order that is shown in FIG. 12. In describing the method 1200, reference may be made to FIGS. 1-11 and 14, although it is understood that the method 1200 may be practiced with any other suitable systems, interfaces and components.

In addition, while the method 1200 and other methods described herein may refer to STAs 103 and APs 102 operating in accordance with 802.11 or other standards, embodiments of these methods are not limited to just those devices and may also be practiced on other mobile devices, such as a HE STA, an HE AP, an Evolved Node-B (eNB) or User Equipment (UE). In some embodiments, the STA 103 described in the method 1200 may be HE STA 103 while the AP 102 may be HE AP 102. The method 1200 and other methods described herein may also be practiced by wireless devices configured to operate in other suitable types of wireless communication systems, including systems configured to operate according to various Third Generation Partnership Project (3GPP) Long Term Evolution (LTE) standards. The method 1200 may also refer to an apparatus for an STA 103 and/or AP 102 or other device described above.

It should be pointed out that in some embodiments of the method 1200 and other methods described herein, the AP 102 may be or may operate as a "beam-former" while the STA 103 may be or may operate as a "beam-formee". That is, the method 1200 may enable usage of beam-formed paths for downlink communication between the AP 102 (beam-former) and the STA 103 (beam-formee) in some cases.

At operation 1202 of the method 1200, the AP 102 may transmit a trigger frame to check readiness of STAs 103. In an embodiment, the trigger frame transmitted at operation 1202 is a case 1 trigger frame, and the operation 1202 comprises transmitting the case 1 trigger frame to associated and unassociated STAs that want to do range estimation (i.e., ranging). At operation 1202, an AID and a pre-AID may be used to identify the STAs 103 and allocate the resource.

At operation 1204, the case 1 trigger frame may be received by the STAs 103, and the STAs 103 may transmit an uplink (UL) short feedback packet (e.g., a short feedback response as shown in FIG. 12). At operation 1204, the AP 102 may receive the short feedback packets from STAs 103, and the AP will know which STA is ready for negotiation (e.g., ready for channel measurement). For example, at operation 1204, the AP 102 may receive, from at least some of the STAs 103, an answer with a "Yes" or "No" on the allocated resource unit. If the STAs 103 are ready for negotiation with the AP 102, those STAs 103 may respond "Yes" (e.g., by sending energy on the allocated resource unit). Otherwise, the STAs 103 may not transmit a signal on the allocated resource unit.

At operation 1206, the AP 102 may send a case 2 trigger frame to solicit the negotiation packets (e.g., MU negotiation packets) from the associated and unassociated STAs 103 with positive feedback. At operation 1206, the AID and pre-AID may be used to allocate resources for the STAs 103 to send negotiation packets.

At operation 1208, negotiation packets may be received by the AP 102. As shown in FIG. 12, a transmission may be received at operation 1208 where the transmission includes negotiation packets from the STAs 103.

Figure 13:
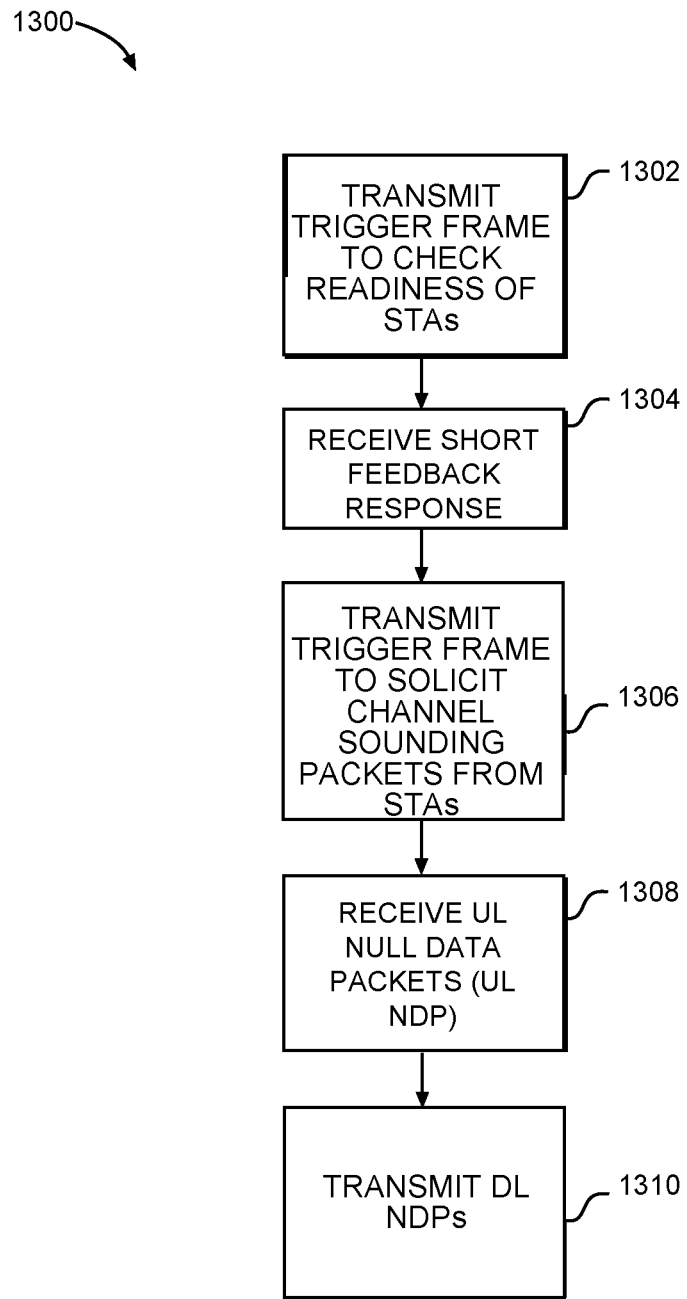
FIG. 13 illustrates the operation of another method of range estimation in accordance with some embodiments.

FIG. 13 illustrates the operation of another method of range estimation in accordance with some embodiments. In particular, FIG. 13 illustrates the operation of a method 1300 of range estimation by using transmissions between an AP and STAs to estimate distances from the STAs to the AP, in accordance with some embodiments. It is important to note that embodiments of the method 1300 may include additional or even fewer operations or processes in comparison to what is illustrated in FIG. 13. In addition, embodiments of the method 1300 are not necessarily limited to the chronological order that is shown in FIG. 13. In describing the method 1300, reference may be made to FIGS. 1-12 and 14, although it is understood that the method 1300 may be practiced with any other suitable systems, interfaces and components.

Further, while the method 1300 and other methods described herein may refer to STAs 103 and APs 102 operating in accordance with 802.11 or other standards, embodiments of those methods are not limited to just those devices and may also be practiced on other mobile devices, such as a HE STA, a HE AP, an Evolved Node-B (eNB) or User Equipment (UE). In some embodiments, the STA 103 described in the method 1300 may be HE STA 103 while the AP 102 may be HE AP 102. The method 1300 and other methods described herein may also be practiced by wireless devices configured to operate in other suitable types of wireless communication systems, including systems configured to operate according to various Third Generation Partnership Project (3GPP) Long Term Evolution (LTE) standards. The method 1300 may also refer to an apparatus for an STA 103 and/or AP 102 or other device described above.

In addition, in some embodiments of the method 1300 and other methods described herein, the AP 102 may be or may operate as a "beam-former," while the STA 103 may be or may operate as a "beam-formee". That is, the method 1300 may enable usage of beam-formed paths for downlink communication between the AP 102 (beam-former) and the STA 103 (beam-formee) in some cases.

At operation 1302 of the method 1300, the AP 102 may transmit a trigger frame to check whether the STAs 103 are ready for a time of arrival (ToA) measurement. At operation 1302, an AID and a pre-AID may be used to identify the STAs and check readiness of the STAs 103.

At operation 1304, the STAs 103 may transmit a UL short feedback packet (e.g., a short feedback response) to the AP 102. At operation 1304, at least some of the STAs 103 may answer with a "Yes" or "No" on the allocated resource unit. If the STAs 103 are ready for negotiation with the AP 102, the STAs 103 may respond "Yes" (e.g., sending energy on the allocated resource unit). Otherwise, the STAs 103 may not transmit a signal on the allocated resource unit. (e.g., a short feedback response as shown in FIG. 13).

At operation 1306, the AP 102 may send a case 3 trigger frame to solicit the channel sounding packet from the associated and unassociated STAs 103 that answer "Yes" in the short feedback packet. In some embodiments, at operation 1306, the AID and pre-AID are used in the case 3 trigger frame to allocate resources for the uplink sounding NDP (UL NDP). For example, the P-matrix may be used for a high-efficiency long training field (HE-LTF) by each STA 103.

At operation 1308, the AP 102 may receive UL NDPs and use the UL NDPs to estimate the channel response from the STAs 103.

Following the UL NDPs, at operation 1310, the AP 102 may transmit a downlink (DL) NDP packet, so that the STAs 103 may estimate the channel response from the AP 102 to the STAs 103. After sending the DL NDPs at operation 1310, the AP 102 and the STAs 103 may exchange the channel state information or ToA information using one or two packets. In this way, the STAs 103 or the AP 102 may derive a round trip time usable for range estimation.

Figure 14:
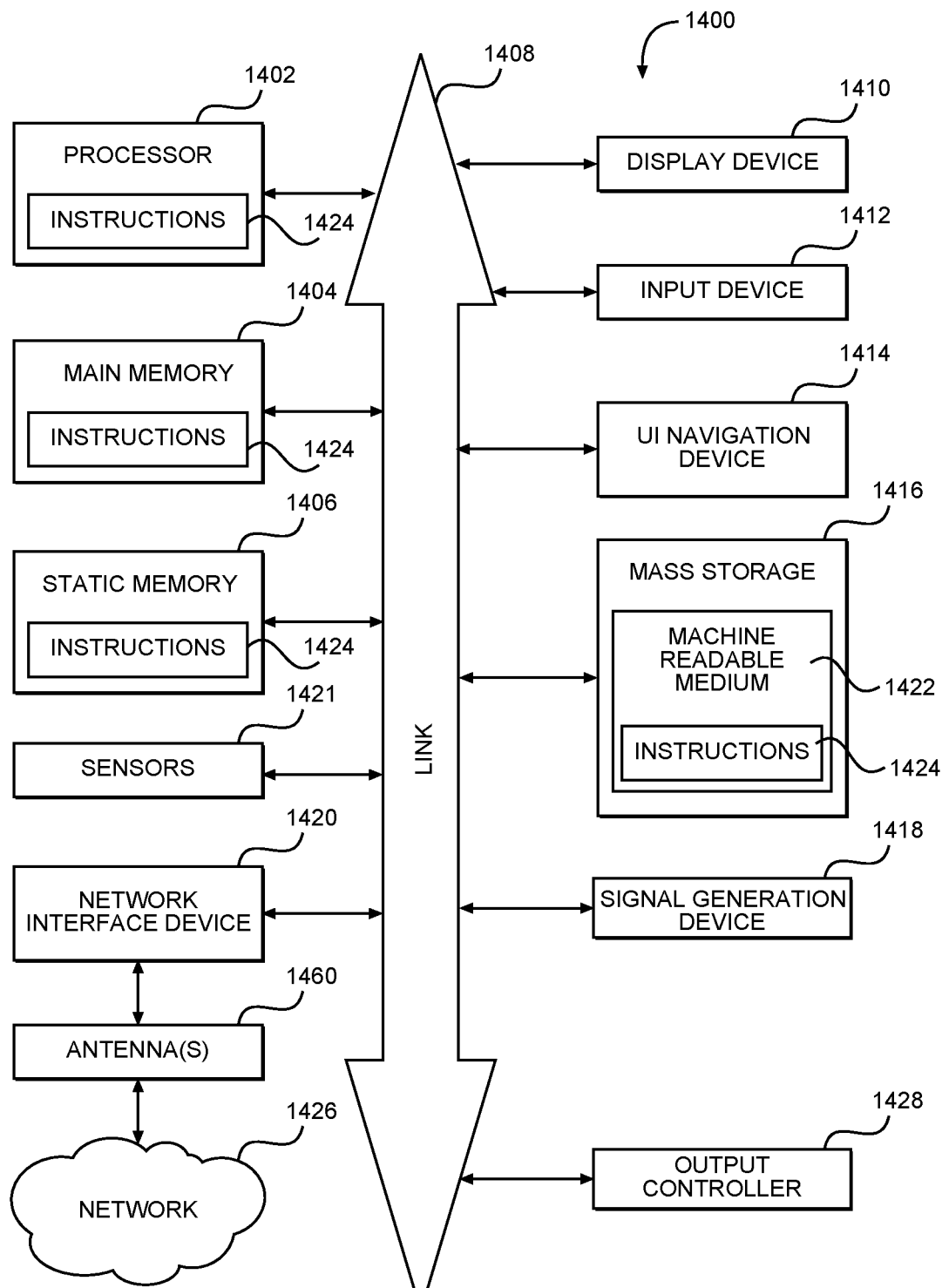
FIG. 14 illustrates a block diagram of an example machine upon which any one or more of the techniques (e.g., methodologies) discussed herein may perform.

FIG. 14 illustrates a block diagram of an example machine 1400 upon which any one or more of the techniques (e.g., methodologies) discussed herein may perform. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a master station 202, HE station 204, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine (see also FIGS. 1 and 2). Further, while only a single machine is illustrated, the term "machine" may also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via a link (e.g., bus) 1408. The machine 1400 may further include a display device 1410, an input device 1412 (e.g., a keyboard), and a user interface (UI) navigation device 1414 (e.g., a mouse). In an example, the display device 1410, input device 1412 and UI navigation device 1414 may be a touch screen display. The machine 1400 may additionally include a mass storage (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1402 and/or instructions 1424 may comprise processing circuitry and/or transceiver circuitry.

The storage device 1416 may include a machine-readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine-readable media.

While the machine-readable medium 1422 is illustrated as a single medium, the term "machine-readable medium" may include a single medium or multiple media (e.g., a centralized or distributed database, and/or associated caches and servers) configured to store the one or more instructions 1424.

An apparatus of the machine 1400 may be one or more of a hardware processor 1402 (e.g., a central processing unit (CPU), a graphics processing unit (GPU), a hardware processor core, or any combination thereof), a main memory 1404 and a static memory 1406, some or all of which may communicate with each other via a link (e.g., bus) 1408.

The term "machine-readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1420 may include one or more physical jacks (e.g., Ethernet, coaxial, or phone jacks) or one or more antennas to connect to the communications network 1426. In an example, the network interface device 1420 may include one or more antennas 1460 to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques. The term "transmission medium" may be taken to include any intangible medium that is capable of storing, encoding or carrying instructions, such as the instructions 1424, for execution by the machine 1400, and includes digital or analog communications signals or other intangible medium to facilitate communication of such software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

EXAMPLES

The following examples pertain to further embodiments.

Example 1 is an apparatus of an access point (AP), the apparatus comprising memory and processing circuitry coupled to the memory, the processing circuitry configured to: encode a common information field of a first trigger frame to include a trigger frame type, the trigger frame configured to check a readiness of associated and unassociated stations (STAs), the first trigger frame configured for transmission to one or more of the STAs; decode feedback from at least some of the one or more STAs; encode, based on the feedback, a common information field of a second trigger frame, the common information field to include one of: a trigger frame type that solicits negotiation packets from the associated and unassociated STAs of the at least some of the one or more STAs using an association identifier (AID) and a pre-AID; or a trigger frame type that solicits channel sounding packets from associated and unassociated STAs of the at least some of the one or more STAs using an AID and a pre-AID, the second trigger frame encoded for transmission to the one or more STAs.

In Example 2, the subject matter of Example 1 optionally includes wherein the feedback comprises uplink (UL) short feedback packets from the at least some of the one or more STAs.

In Example 3, the subject matter of any one or more of Examples 1-2 optionally include wherein the feedback indicates whether respective ones of the at least some of the one or more STAs are ready to send negotiation packets for a measurement parameter negotiation phase.

In Example 4, the subject matter of any one or more of Examples 1-3 optionally include the processing circuitry further configured to: decode negotiation packets received from the at least some of the one or more STAs in response to the second trigger frame.

In Example 5, the subject matter of Example 4 optionally includes wherein the negotiation packets include multi-user (MU) negotiation packets.

In Example 6, the subject matter of any one or more of Examples 1-5 optionally include the processing circuitry further configured to: decode UL null data packets (NDPs) received from the at least some of the one or more STAs in response to the second trigger frame; and encode downlink (DL) NDPs for transmission to the at least some of the one or more STAs, wherein the DL NDPs are useable to estimate channel responses from the AP to the at least some of the one or more STAs.

In Example 7, the subject matter of any one or more of Examples 1-6 optionally include wherein the AP and the one or more STAs are configured to operate in a high-efficiency wireless local area network (HE) that supports uplink beamforming for the feedback.

In Example 8, the subject matter of any one or more of Examples 1-7 optionally include transceiver circuitry coupled to the processing circuitry; and one or more antennas coupled to the transceiver circuitry for transmission of the first trigger frame, reception of the feedback, and transmission of the second trigger frame.

In Example 9, the subject matter of any one or more of Examples 1-8 optionally include wherein the AP is an Institute of Electrical and Electronic Engineers (IEEE) 802.11 access point.

In Example 10, the subject matter of Example 9 optionally includes wherein the AP is an IEEE 802.11ax access point.

In Example 11, the subject matter of any one or more of Examples 1-10 optionally include wherein the one or more stations include one or more IEEE 802.11 stations.

In Example 12, the subject matter of Example 11 optionally includes wherein the one or more stations include one or more IEEE 802.11ax stations.

Example 13 is a non-transitory computer-readable storage medium that stores instructions for execution by one or more processors of an access point (AP) to perform operations, the operations to configure the one or more processors to: encode a common information field of a first trigger frame to include a trigger frame type, the trigger frame configured to check a readiness of associated and unassociated stations (STAs), the first trigger frame configured for transmission to one or more of the STAs; transmit the first trigger frame to one or more STAs; decode feedback from at least some of the one or more STAs; encode, based on the feedback, a common information field of a second trigger frame, the common information field to include one of: a trigger frame type that solicits negotiation packets from the associated and unassociated STAs of the at least some of the one or more STAs using an association identifier (AID) and a pre-AID; or a trigger frame type that solicits channel sounding packets from associated and unassociated STAs of the at least some of the one or more STAs using an AID and a pre-AID, the second trigger frame encoded for transmission to the one or more STAs.

In Example 14, the subject matter of Example 13 optionally includes wherein the feedback comprises uplink (UL) short feedback packets from the at least some of the one or more STAs.

In Example 15, the subject matter of any one or more of Examples 13-14 optionally include wherein the feedback indicates whether respective ones of the at least some of the one or more STAs are ready to send negotiation packets for a measurement parameter negotiation phase.

In Example 16, the subject matter of any one or more of Examples 13-15 optionally include the operations to further configure the one or more processors to: decode negotiation packets received from the at least some of the one or more STAs in response to the second trigger frame.

In Example 17, the subject matter of Example 16 optionally includes wherein the negotiation packets include multi-user (MU) negotiation packets.

In Example 18, the subject matter of any one or more of Examples 13-17 optionally include the operations to further configure the one or more processors to: decode UL null data packets (NDPs) received from the at least some of the one or more STAs in response to the second trigger frame; and encode downlink (DL) NDPs for transmission to the at least some of the one or more STAs, wherein the DL NDPs are useable to estimate channel responses from the AP to the at least some of the one or more STAs.

In Example 19, the subject matter of any one or more of Examples 13-18 optionally include wherein the AP and the one or more STAs are configured to operate in a high-efficiency wireless local area network (HE) that supports uplink beam-forming for the feedback.

In Example 20, the subject matter of any one or more of Examples 13-19 optionally include wherein the AP is an Institute of Electrical and Electronic Engineers (IEEE) 802.11 access point.

In Example 21, the subject matter of Example 20 optionally includes wherein the AP is an IEEE 802.11ax access point.

In Example 22, the subject matter of any one or more of Examples 13-21 optionally include wherein the one or more stations include one or more IEEE 802.11 stations.

In Example 23, the subject matter of Example 22 optionally includes wherein the one or more stations include one or more IEEE 802.11ax stations.

Example 24 is a method performed at an access point (AP), the method comprising: encoding a common information field of a first trigger frame to include a trigger frame type, the trigger frame configured to check a readiness of associated and unassociated stations (STAs), the first trigger frame configured for transmission to one or more of the STAs; transmitting the first trigger frame to one or more STAs; receiving feedback from at least some of the one or more STAs; encoding, based on the feedback, a common information field of a second trigger frame, the common information field to include one of: a trigger frame type that solicits negotiation packets from the associated and unassociated STAs of the at least some of the one or more STAs using an association identifier (AID) and a pre-AID; or a trigger frame type that solicits channel sounding packets from associated and unassociated STAs of the at least some of the one or more STAs using an AID and a pre-AID, the second trigger frame encoded for transmission to the one or more STAs; and transmitting the second trigger frame to the one or more STAs.

In Example 25, the subject matter of Example 24 optionally includes wherein the feedback comprises uplink (UL) short feedback packets from the at least some of the one or more STAs.

In Example 26, the subject matter of any one or more of Examples 24-25 optionally include wherein the feedback indicates whether respective ones of the at least some of the one or more STAs are ready to send negotiation packets for a measurement parameter negotiation phase.

In Example 27, the subject matter of any one or more of Examples 24-26 optionally include decoding negotiation packets received from the at least some of the one or more STAs in response to the second trigger frame.

In Example 28, the subject matter of Example 27 optionally includes wherein the negotiation packets include multi-user (MU) negotiation packets.

In Example 29, the subject matter of any one or more of Examples 24-28 optionally include the method further comprising: receiving, in response to the second trigger frame, UL null data packets (NDPs) received from the at least some of the one or more STAs in response to the second trigger frame; decoding the UL NDPs; encoding downlink (DL) NDPs for transmission to the at least some of the one or more STAs, wherein the DL NDPs are useable to estimate channel responses from the AP to the at least some of the one or more STAs; and transmitting the DL NDPs to the at least some of the one or more STAs.

In Example 30, the subject matter of any one or more of Examples 24-29 optionally include the method further comprising: receiving, in response to the second trigger frame, multi-user (MU) negotiation packets from the at least some of the one or more STAs.

In Example 31, the subject matter of any one or more of Examples 24-30 optionally include wherein the AP is an Institute of Electrical and Electronic Engineers (IEEE) 802.11 access point.

In Example 32, the subject matter of Example 31 optionally includes wherein the AP is an IEEE 802.11ax access point.

In Example 33, the subject matter of any one or more of Examples 24-32 optionally include wherein the one or more stations include one or more IEEE 802.11 stations.

In Example 34, the subject matter of Example 33 optionally includes wherein the one or more stations include one or more IEEE 802.11ax stations.

Example 35 is an apparatus for a user station (STA), the apparatus comprising memory and processing circuitry coupled to the memory, the processing circuitry configured to: decode a first trigger frame, wherein a common information field of the first trigger frame has been encoded by an AP to include a trigger frame type, the trigger frame configured to check a readiness of associated and unassociated stations (STAs); encode feedback for the AP, the feedback indicating whether the STA is ready to send negotiation packets for a measurement parameter negotiation phase; decode a second trigger frame, wherein a common information field of the second trigger frame has been encoded by the AP to include one of: a trigger frame type that solicits negotiation packets from associated and unassociated STAs using an association identifier (AID) and a pre-AID; or a trigger frame type that solicits channel sounding packets from associated and unassociated STAs using an AID and a pre-AID.

In Example 36, the subject matter of Example 35 optionally includes wherein the feedback comprises uplink (UL) short feedback packets.

In Example 37, the subject matter of any one or more of Examples 35-36 optionally include wherein the feedback indicates whether the STA is ready to send negotiation packets for a measurement parameter negotiation phase.

In Example 38, the subject matter of any one or more of Examples 35-37 optionally include the processing circuitry further configured to: encode negotiation packets for the AP in response to the second trigger frame.

In Example 39, the subject matter of Example 38 optionally includes wherein the negotiation packets include multi-user (MU) negotiation packets.

In Example 40, the subject matter of any one or more of Examples 35-39 optionally include the processing circuitry further configured to: encode UL null data packets (NDPs) for the AP in response to the second trigger frame; and decode downlink (DL) NDPs, wherein the DL NDPs have been encoded by the AP to be useable to estimate channel responses from the AP to the STA.

In Example 41, the subject matter of any one or more of Examples 35-40 optionally include wherein the AP and the STA are configured to operate in a high-efficiency wireless local area network (HE) that supports uplink beam-forming for the feedback.

In Example 42, the subject matter of any one or more of Examples 35-41 optionally include transceiver circuitry coupled to the processing circuitry; and one or more antennas coupled to the transceiver circuitry for reception of the first trigger frame, transmission of the feedback, and reception of the second trigger frame.

In Example 43, the subject matter of Example 42 optionally includes the one or more antennas configured to: transmit, in response to the second trigger frame, to the AP, one of: a UL NDP; or a MU negotiation packet.

In Example 44, the subject matter of any one or more of Examples 35-43 optionally include wherein the AP is an Institute of Electrical and Electronic Engineers (IEEE) 802.11 access point.

In Example 45, the subject matter of Example 44 optionally includes wherein the AP is an IEEE 802.11ax access point.

In Example 46, the subject matter of any one or more of Examples 35-45 optionally include wherein the one or more stations include one or more IEEE 802.11 stations.

In Example 47, the subject matter of Example 46 optionally includes wherein the one or more stations include one or more IEEE 802.11ax stations.

In Example 48, the subject matter of any one or more of Examples 35-47 optionally include wherein the AP is a high-efficiency (HE) wireless local area network AP and the STA is an HE STA.

Example 49 is at least one machine-readable medium including instructions, which when executed by a machine, cause the machine to perform operations of any of the operations of Examples 1-48.

Example 50 is an apparatus comprising means for performing any of the operations of Examples 1-48.

Example 51 is a system to perform the operations of any of Examples 1-48.

Example 52 is a method to perform the operations of any of Examples 1-48.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a station (STA) configurable to perform a ranging procedure, the STA comprising: memory, and processing circuitry coupled to the memory, the processing circuitry configured to:
    decode an initial ranging trigger frame comprising a ranging trigger subtype field and a common information field, the ranging trigger subtype field to indicate that the initial ranging trigger frame is a trigger frame for polling, the common information field to indicate whether one or more trigger frames for polling are to be subsequently transmitted,
    wherein the processing circuitry is configured to decode one or more user information fields of the initial ranging trigger frame, the user information fields to identify one or more STAs available to participate in the ranging procedure,
    wherein if the STA is identified in one of the user information fields, the processing circuitry is to configure the STA to remain ready to participate in an initial ranging instance of the ranging procedure, and
    wherein if the STA is not identified in one of the user information fields and if the common information field indicates that more than one trigger frame ranging poll is to be transmitted, the processing circuitry is to configure the STA to be ready to participate in a subsequent ranging instance of the ranging procedure, the subsequent ranging instance to follow the initial ranging instance,
    if the STA was identified in one of the user information fields of the initial ranging trigger frame, the processing circuitry is configured to encode a feedback frame for transmission, the feedback frame indicating the STA's participation in ranging measurements during the initial ranging instance;
    if the STA was not identified in one of the user information fields of the initial ranging trigger frame, the processing circuitry is to:
    configure the STA to be ready to decode a subsequent ranging trigger frame received after the initial ranging instance, the subsequent ranging trigger frame having a ranging trigger subtype field to indicate that the subsequent ranging trigger frame is a trigger frame ranging poll;
    determine if the STA is identified in one of the user information fields of the subsequent ranging trigger frame for participation in the subsequent ranging instance; and
    encode a feedback frame for transmission if the STA is identified in one of the user information fields of the subsequent ranging trigger frame, the feedback frame to indicate the STA's participation in ranging measurements during the subsequent ranging instance.

2. The apparatus of claim 1, wherein for performing the initial ranging instance, the processing circuitry is configured to:
    decode a ranging trigger frame;
    encode, in response to the ranging trigger frame, an uplink null data packet (UL NDP) for transmission; and
    decode a downlink NDP, wherein the DL NDP and the UL NDP include ranging measurements.

3. The apparatus of claim 1, where the STA is configured to indicate it's availability for ranging prior to receipt of the initial ranging trigger frame.

4. The apparatus of claim 1, wherein the one or more other STAs identified in the user information fields comprise associated and unassociated STAs indicated to be available during the initial ranging instance and the subsequent ranging instance.

5. The apparatus of claim 1, wherein if the STA is not identified in one of the user information fields of the initial ranging trigger frame and if the common information field of the initial ranging trigger frame indicates that more than one of the trigger frame ranging poll is to be transmitted, the processing circuitry is to configure the STA for non-participation in the initial ranging instance of the ranging procedure.

6. The apparatus of claim 1, wherein if the STA is not identified in one of the user information fields of the initial ranging trigger frame and if the common information field of the initial ranging trigger frame indicates that more than one of the trigger frame ranging poll is to be transmitted, the processing circuitry is to configure the STA to be in a low-power state for non-participation in the initial ranging instance of the ranging procedure.

7. The apparatus of claim 1 further comprising:
mixer circuitry to down-convert RF signals to baseband signals; and
synthesizer circuitry, the synthesizer circuitry comprising one of a fractional-N synthesizer or a fractional N/N+1 synthesizer, the synthesizer circuitry configured to generate an output frequency for use by the mixer circuitry,
wherein the processing circuitry is configured to decode the baseband signals, the baseband signals including the initial ranging trigger frame.

8. The apparatus of claim 1 further comprising:
mixer circuitry to down-convert RF signals to baseband signals; and
synthesizer circuitry, the synthesizer circuitry comprising a delta-sigma synthesizer, the synthesizer circuitry configured to generate an output frequency for use by the mixer circuitry,
wherein the processing circuitry is configured to decode the baseband signals, the baseband signals including the initial ranging trigger frame.

9. The apparatus of claim 1 wherein the memory is configured to store the initial ranging trigger frame.

10. The apparatus of claim 1 further comprising transceiver circuitry coupled to two or more antennas.

11. An apparatus of a station (STA), the STA comprising memory and processing circuitry coupled to the memory, the processing circuitry configured to:
encode an initial ranging trigger frame to include a ranging trigger subtype field and a common information field, the ranging trigger subtype field to indicate that the initial ranging trigger frame is a trigger frame for polling, the common information field to indicate whether one or more trigger frames for polling are to be subsequently transmitted,
wherein the processing circuitry is configured to encode the initial ranging trigger frame to include one or more user information fields to identify one or more other STAs,
wherein the one or more other STAs identified in the user information fields of the initial ranging trigger frame are to remain ready to participate in an initial ranging instance, and
wherein if the common information field indicates that more than one trigger frame ranging poll is to be transmitted, STAs not identified in the user information fields of the initial ranging trigger frame are to be ready to participate in a subsequent ranging instance that follows the initial ranging instance;
decode feedback from at least some of the one or more other STAs identified in the user information fields of the initial ranging trigger frame, the feedback indicating a STA's participation in ranging measurements during the initial ranging instance;
after the initial ranging instance, if the common information field of the initial ranging trigger frame indicated that more than one trigger frame ranging poll is to be transmitted, the processing circuitry is configured to encode a subsequent ranging trigger frame for transmission after the initial ranging instance, the subsequent ranging trigger frame having a ranging trigger subtype field to indicate that the subsequent ranging trigger frame is a trigger frame ranging poll; and
wherein the processing circuitry is configured to:
encode the subsequent ranging trigger frame to include one or more user information fields to identify STAs that were not identified in the user information fields of the initial ranging trigger frame; and
decode feedback from at least some of the STAs identified in the user information fields of the subsequent ranging trigger frame, the feedback indicating a STAs participation in ranging measurements during the subsequent ranging instance.

12. The apparatus of claim 11, wherein for performing the initial ranging instance, the processing circuitry is configured to:
encode a ranging trigger frame for transmission;
decode, in response to the ranging trigger frame, uplink null data packets (UL NDPs) from the STAs for which feedback was received in response to the initial ranging trigger frame; and
decode a downlink NDP for transmission, wherein the DL NDP and the UL NDPs include ranging measurements.

13. The apparatus of claim 11, wherein the processing circuitry is configured to receive ranging availability information from one or more of the other STAs prior to transmission of the initial ranging trigger frame.

14. The apparatus of claim 11, wherein the one or more other STAs identified in the user information fields comprise associated and unassociated STAs indicated to be available during the initial ranging instance and the subsequent ranging instance.

15. The apparatus of claim 11 further comprising:
mixer circuitry to down-convert RF signals to baseband signals; and
synthesizer circuitry, the synthesizer circuitry comprising one of a fractional-N synthesizer or a fractional N/N+1 synthesizer, the synthesizer circuitry configured to generate an output frequency for use by the mixer circuitry,
wherein the processing circuitry is configured to encode the baseband signals, the baseband signals including the initial ranging trigger frame.

16. The apparatus of claim 11 further comprising:
mixer circuitry to down-convert RF signals to baseband signals; and
synthesizer circuitry, the synthesizer circuitry comprising a delta-sigma synthesizer, the synthesizer circuitry configured to generate an output frequency for use by the mixer circuitry,
wherein the processing circuitry is configured to encode the baseband signals, the baseband signals including the initial ranging trigger frame.

17. The apparatus of claim 11 wherein the memory is configured to store the initial ranging trigger frame.

18. The apparatus of claim 11 further comprising transceiver circuitry coupled to two or more antennas.

19. A non-transitory computer-readable storage medium that stores instructions for execution by processing circuitry a station (STA) to configure the STA to perform a ranging procedure, the processing circuitry configured to:

decode an initial ranging trigger frame comprising a ranging trigger subtype field and a common information field, the ranging trigger subtype field to indicate that the initial ranging trigger frame is a trigger frame for polling, the common information field to indicate whether one or more trigger frames for polling are to be subsequently transmitted, wherein the processing circuitry is configured to decode one or more user information fields of the initial ranging trigger frame, the user information fields to identify one or more STAs available to participate in the ranging procedure, wherein if the STA is identified in one of the user information fields, the processing circuitry is to configure the STA to remain ready to participate in an initial ranging instance of the ranging procedure, and wherein if the STA is not identified in one of the user information fields and if the common information field indicates that more than one trigger frame ranging poll is to be transmitted, the processing circuitry is to configure the STA to be ready to participate in a subsequent ranging instance of the ranging procedure, the subsequent ranging instance to follow the initial ranging instance, if the STA was identified in one of the user information fields of the initial ranging trigger frame, the processing circuitry is configured to encode a feedback frame for transmission, the feedback frame indicating the STA's participation in ranging measurements during the initial ranging instance;

if the STA was not identified in one of the user information fields of the initial ranging trigger frame, the processing circuitry is to:

configure the STA to be ready to decode a subsequent ranging trigger frame received after the initial ranging instance, the subsequent ranging trigger frame having a ranging trigger subtype field to indicate that the subsequent ranging trigger frame is a trigger frame ranging poll;

determine if the STA is identified in one of the user information fields of the subsequent ranging trigger frame for participation in the subsequent ranging instance; and encode a feedback frame for transmission if the STA is identified in one of the user information fields of the subsequent ranging trigger frame, the feedback frame to indicate the STA's participation in ranging measurements during the subsequent ranging instance.

20. The non-transitory computer-readable storage medium of claim 19, wherein for performing the initial ranging instance, the processing circuitry is configured to:

decode a ranging trigger frame;

encode, in response to the ranging trigger frame, an uplink null data packet (UL NDP) for transmission; and decode a downlink NDP, wherein the DL NDP and the UL NDP include ranging measurements.

* * * * *